(12) United States Patent
Obradovich et al.

(10) Patent No.: US 7,702,455 B2
(45) Date of Patent: Apr. 20, 2010

(54) PERSONAL COMMUNICATION SYSTEM TO SEND AND RECEIVE VOICE DATA POSITIONING INFORMATION

(75) Inventors: Michael L. Obradovich, San Clemente, CA (US); John Dinkel, Irvine, CA (US); Michael Kent, Garden Grove, CA (US)

(73) Assignee: American Calcar, Inc., Wilmington, DE (US)

( * ) Notice: Subject to any disclaimer, the term of this patent is extended or adjusted under 35 U.S.C. 154(b) by 9 days.

(21) Appl. No.: 11/650,640

(22) Filed: Jan. 8, 2007

(65) Prior Publication Data

US 2007/0112508 A1 May 17, 2007

Related U.S. Application Data

(60) Continuation of application No. 11/079,879, filed on Mar. 14, 2005, which is a continuation of application No. 10/376,971, filed on Feb. 27, 2003, now Pat. No. 6,868,335, which is a continuation of application No. 09/669,527, filed on Sep. 25, 2000, now Pat. No. 6,529,824, which is a division of application No. 08/879,955, filed on Jun. 20, 1997, now Pat. No. 6,148,261.

(51) Int. Cl.
*G08G 1/123* (2006.01)

(52) U.S. Cl. ........................ 701/208; 342/350

(58) Field of Classification Search ............... 701/200, 701/201, 207–209, 213; 342/350, 357.01, 342/357.06, 357.13, 454, 456; 340/988–995.1, 340/995.12, 995.13
See application file for complete search history.

(56) References Cited

U.S. PATENT DOCUMENTS

| 3,582,926 A | 6/1971 | Hassan |
| 4,207,609 A | 6/1980 | Luiz et al. |
| 4,291,749 A | 9/1981 | Ootsuka et al. |
| 4,314,232 A | 2/1982 | Tsunoda |
| 4,337,821 A | 7/1982 | Saito |

(Continued)

FOREIGN PATENT DOCUMENTS

DE 4431070 3/1996

(Continued)

OTHER PUBLICATIONS

Office Action for Reexamination U.S. Appl. No. 90/007,895, filed Jan. 23, 2006, entitled "Personal Communication System To Send And Receive Voice Data Positioning Information", inventor Michael L. Obradovich, Office Action mailed Sep. 13, 2006 (70 pgs.).

(Continued)

*Primary Examiner*—Dalena Tran
(74) *Attorney, Agent, or Firm*—Klein, O'Neill & Singh, LLP

(57) ABSTRACT

A location tagged data provision and display system. A personal communication device (PCD) with electromagnetic communication capability has a GPS receiver and a display. The PCD requests maps and location tagged data from data providers and other for display on the PCD. The data providers respond to requests by using searching and sorting schemes to interrogate data bases and then automatically transmitting data responsive to the requests to the requesting PCD.

7 Claims, 31 Drawing Sheets

U.S. PATENT DOCUMENTS

| | | |
|---|---|---|
| 4,350,970 A | 9/1982 | von Tomkewitsch |
| 4,401,848 A | 8/1983 | Tsunoda |
| 4,407,564 A | 10/1983 | Ellis |
| 4,419,730 A | 12/1983 | Ito et al. |
| 4,441,405 A | 4/1984 | Takeuchi |
| 4,481,584 A | 11/1984 | Holland |
| 4,521,857 A | 6/1985 | Reynolds, III |
| 4,536,739 A | 8/1985 | Nobuta |
| 4,582,389 A | 4/1986 | Wood et al. |
| 4,636,782 A | 1/1987 | Nakamura et al. |
| 4,716,458 A | 12/1987 | Heitzman et al. |
| 4,731,769 A | 3/1988 | Schaefer et al. |
| 4,740,779 A | 4/1988 | Cleary et al. |
| 4,740,780 A | 4/1988 | Brown et al. |
| 4,752,824 A | 6/1988 | Moore |
| 4,792,803 A | 12/1988 | Madnick et al. |
| 4,795,223 A | 1/1989 | Moss |
| 4,809,177 A | 2/1989 | Windle et al. |
| 4,812,843 A | 3/1989 | Champion, III et al. |
| 4,818,048 A | 4/1989 | Moss |
| 4,827,520 A | 5/1989 | Zeinstra |
| 4,837,551 A | 6/1989 | Iino |
| 4,876,594 A | 10/1989 | Schiffman |
| 4,914,705 A | 4/1990 | Nigawara |
| 4,977,509 A | 12/1990 | Pitchford et al. |
| 4,988,976 A | 1/1991 | Lu |
| 4,995,258 A | 2/1991 | Frank |
| 4,996,959 A | 3/1991 | Akimoto |
| 5,006,829 A | 4/1991 | Miyamoto et al. |
| 5,023,934 A | 6/1991 | Wheeless |
| 5,043,736 A | 8/1991 | Darnell et al. |
| 5,051,735 A | 9/1991 | Furukawa |
| 5,070,323 A | 12/1991 | Iino et al. |
| 5,075,693 A | 12/1991 | McMillan et al. |
| 5,119,504 A | 6/1992 | Durboraw, III |
| 5,124,915 A | 6/1992 | Krenzel |
| 5,127,674 A | 7/1992 | Lamphere et al. |
| 5,157,614 A | 10/1992 | Kashiwazaki et al. |
| 5,164,904 A | 11/1992 | Sumner |
| 5,179,385 A | 1/1993 | O'Loughlin et al. |
| 5,189,632 A | 2/1993 | Paajanen et al. |
| 5,198,797 A | 3/1993 | Daidoji |
| 5,203,499 A | 4/1993 | Knittel |
| 5,214,413 A | 5/1993 | Okabayashi et al. |
| 5,214,707 A | 5/1993 | Fujimoto et al. |
| 5,214,793 A | 5/1993 | Conway |
| 5,225,843 A | 7/1993 | Thompson |
| 5,235,633 A | 8/1993 | Dennison et al. |
| 5,239,700 A | 8/1993 | Guenther et al. |
| 5,257,190 A | 10/1993 | Crane |
| 5,265,024 A | 11/1993 | Crabill et al. |
| 5,267,042 A | 11/1993 | Tsuchiya et al. |
| 5,272,638 A | 12/1993 | Martin et al. |
| 5,274,560 A | 12/1993 | LaRue |
| 5,278,532 A | 1/1994 | Hegg et al. |
| 5,293,115 A | 3/1994 | Swanson |
| 5,295,064 A | 3/1994 | Malec et al. |
| 5,299,132 A | 3/1994 | Wortham |
| 5,334,974 A | 8/1994 | Simms et al. |
| 5,335,276 A | 8/1994 | Thompson et al. |
| 5,335,743 A | 8/1994 | Gillbrand et al. |
| 5,345,817 A | 9/1994 | Grenn et al. |
| 5,351,041 A | 9/1994 | Ikata et al. |
| 5,361,165 A | 11/1994 | Stringfellow et al. |
| 5,371,510 A | 12/1994 | Miyauchi et al. |
| 5,400,045 A | 3/1995 | Aoki |
| 5,400,246 A | 3/1995 | Wilson et al. |
| 5,404,443 A | 4/1995 | Hirata |
| 5,406,493 A | 4/1995 | Goto et al. |
| 5,408,686 A | 4/1995 | Mankovitz |
| 5,412,573 A | 5/1995 | Barnea et al. |
| 5,414,439 A | 5/1995 | Groves et al. |
| 5,416,318 A | 5/1995 | Hegyi |
| 5,420,592 A | 5/1995 | Johnson |
| 5,422,565 A | 6/1995 | Swanson |
| 5,432,841 A | 7/1995 | Rimer |
| 5,432,904 A | 7/1995 | Wong |
| 5,440,428 A | 8/1995 | Hegg et al. |
| 5,442,553 A | 8/1995 | Parrillo |
| 5,450,321 A | 9/1995 | Crane |
| 5,450,329 A | 9/1995 | Tanner |
| 5,450,613 A | 9/1995 | Takahara et al. |
| 5,475,399 A | 12/1995 | Borsuk |
| 5,479,157 A | 12/1995 | Suman et al. |
| 5,479,351 A | 12/1995 | Woo et al. |
| 5,479,482 A | 12/1995 | Grimes |
| 5,483,632 A | 1/1996 | Kuwamoto et al. |
| 5,486,840 A | 1/1996 | Borrego et al. |
| 5,493,658 A | 2/1996 | Chiang et al. |
| 5,497,271 A | 3/1996 | Muvanny et al. |
| 5,497,339 A | 3/1996 | Bernard |
| 5,504,482 A | 4/1996 | Schreder |
| 5,504,622 A | 4/1996 | Oikawa et al. |
| 5,504,684 A | 4/1996 | Lau et al. |
| 5,506,595 A | 4/1996 | Fukano et al. |
| 5,511,724 A | 4/1996 | Freiberger et al. |
| 5,517,193 A | 5/1996 | Allison et al. |
| 5,519,403 A | 5/1996 | Bickley et al. |
| 5,519,410 A | 5/1996 | Smalanskas et al. |
| 5,523,559 A | 6/1996 | Swanson |
| 5,523,950 A | 6/1996 | Peterson |
| 5,525,977 A | 6/1996 | Suman |
| 5,528,248 A | 6/1996 | Steiner et al. |
| 5,528,493 A | 6/1996 | Potter |
| 5,528,496 A | 6/1996 | Brauer et al. |
| 5,534,888 A | 7/1996 | Lebby et al. |
| 5,539,645 A | 7/1996 | Mandhyan et al. |
| 5,539,869 A | 7/1996 | Spoto et al. |
| 5,543,789 A | 8/1996 | Behr et al. |
| 5,544,061 A | 8/1996 | Morimoto et al. |
| 5,547,125 A | 8/1996 | Hennessee et al. |
| 5,553,661 A | 9/1996 | Beyerlein et al. |
| 5,555,172 A | 9/1996 | Potter |
| 5,555,286 A | 9/1996 | Tendler |
| 5,555,502 A | 9/1996 | Opel |
| 5,559,520 A | 9/1996 | Barzegar et al. |
| 5,559,707 A | 9/1996 | DeLorme et al. |
| 5,572,204 A | 11/1996 | Timm et al. |
| 5,576,724 A | 11/1996 | Fukatsu et al. |
| 5,579,535 A | 11/1996 | Orlen et al. |
| 5,596,319 A | 1/1997 | Spry |
| 5,600,796 A | 2/1997 | Okamura et al. |
| 5,604,676 A | 2/1997 | Penzias |
| 5,619,412 A | 4/1997 | Hapka |
| 5,621,252 A | 4/1997 | Bucknam |
| 5,625,668 A | 4/1997 | Loomis et al. |
| 5,625,884 A | 4/1997 | Gitlin et al. |
| 5,627,547 A | 5/1997 | Ramaswamy et al. |
| 5,627,549 A | 5/1997 | Park |
| 5,630,068 A | 5/1997 | Vela et al. |
| 5,638,279 A | 6/1997 | Kishi et al. |
| 5,638,305 A | 6/1997 | Kobayashi et al. |
| 5,639,305 A | 6/1997 | Brown et al. |
| 5,640,156 A | 6/1997 | Okuda et al. |
| 5,642,285 A | 6/1997 | Woo et al. |
| 5,648,763 A | 7/1997 | Long |
| 5,648,769 A | 7/1997 | Sato et al. |
| 5,650,929 A | 7/1997 | Potter et al. |
| 5,652,379 A | 7/1997 | Fukatani |
| 5,653,386 A | 8/1997 | Hennessee et al. |
| 5,654,715 A | 8/1997 | Hayashikura et al. |
| 5,654,886 A | 8/1997 | Zereski, Jr. et al. |
| 5,661,652 A | 8/1997 | Sprague et al. |
| 5,663,548 A | 9/1997 | Hayashi et al. |

| | | | | | | |
|---|---|---|---|---|---|---|
| 5,666,102 A | 9/1997 | Lahiff | | 6,122,506 A | 9/2000 | Lau et al. |
| 5,670,953 A | 9/1997 | Satoh et al. | | 6,124,825 A | 9/2000 | Eschenbach |
| 5,673,039 A | 9/1997 | Pietzsch et al. | | 6,127,945 A | 10/2000 | Mura-Smith |
| 5,675,732 A | 10/1997 | Majeti et al. | | 6,128,559 A | 10/2000 | Saitou et al. |
| 5,677,837 A | 10/1997 | Reynolds | | 6,131,060 A | 10/2000 | Obradovich et al. |
| 5,680,444 A | 10/1997 | Reeves | | 6,131,066 A | 10/2000 | Ahrens et al. |
| 5,682,525 A | 10/1997 | Bouve et al. | | 6,131,067 A | 10/2000 | Girerd et al. |
| 5,684,490 A | 11/1997 | Young et al. | | 6,133,853 A | 10/2000 | Obradovich et al. |
| 5,689,252 A | 11/1997 | Ayanoglu et al. | | 6,134,501 A | 10/2000 | Oumi |
| 5,691,695 A | 11/1997 | Lahiff | | 6,144,920 A | 11/2000 | Mikame |
| 5,694,514 A | 12/1997 | Evans et al. | | 6,147,598 A | 11/2000 | Murphy et al. |
| 5,699,056 A | 12/1997 | Yoshida | | 6,148,261 A | 11/2000 | Obradovich et al. |
| 5,699,255 A | 12/1997 | Ellis et al. | | 6,161,071 A | 12/2000 | Shuman et al. |
| 5,702,165 A | 12/1997 | Koibuchi | | 6,163,749 A | 12/2000 | McDonough et al. |
| 5,712,640 A | 1/1998 | Andou et al. | | 6,163,753 A | 12/2000 | Beckmann et al. |
| 5,719,936 A | 2/1998 | Hillenmayer | | 6,166,626 A | 12/2000 | Janky et al. |
| 5,727,053 A | 3/1998 | Sizer, II et al. | | 6,169,515 B1 | 1/2001 | Mannings et al. |
| 5,731,997 A | 3/1998 | Manson et al. | | 6,169,955 B1 | 1/2001 | Fultz |
| 5,734,973 A | 3/1998 | Honda | | 6,173,231 B1 | 1/2001 | Chojnacki |
| 5,742,509 A | 4/1998 | Goldberg et al. | | 6,175,782 B1 | 1/2001 | Obradovich et al. |
| 5,745,855 A | 4/1998 | Futamura | | 6,184,801 B1 | 2/2001 | Janky |
| 5,748,106 A | 5/1998 | Schoenian et al. | | 6,185,427 B1 | 2/2001 | Krasner et al. |
| 5,752,754 A | 5/1998 | Amitani et al. | | 6,188,957 B1 | 2/2001 | Bechtolsheim et al. |
| 5,757,359 A | 5/1998 | Morimoto et al. | | 6,192,312 B1 | 2/2001 | Hummelsheim |
| 5,758,311 A | 5/1998 | Tsuji et al. | | 6,192,314 B1 | 2/2001 | Khavakh et al. |
| 5,760,742 A | 6/1998 | Branch et al. | | 6,199,013 B1 | 3/2001 | O'Shea |
| 5,771,455 A * | 6/1998 | Kennedy et al. ......... 455/456.4 | | 6,202,023 B1 | 3/2001 | Hancock et al. |
| 5,774,070 A | 6/1998 | Rendon | | 6,208,934 B1 | 3/2001 | Bechtolsheim et al. |
| 5,774,825 A | 6/1998 | Reynolds | | 6,212,392 B1 | 4/2001 | Fitch et al. |
| 5,774,827 A | 6/1998 | Smith, Jr. et al. | | 6,212,470 B1 | 4/2001 | Seymour et al. |
| 5,777,394 A | 7/1998 | Arold | | 6,212,472 B1 | 4/2001 | Nonaka et al. |
| 5,781,150 A | 7/1998 | Norris | | 6,212,473 B1 | 4/2001 | Stefan et al. |
| 5,786,789 A | 7/1998 | Janky | | 6,212,550 B1 | 4/2001 | Segur |
| 5,790,973 A | 8/1998 | Blaker et al. | | 6,219,557 B1 | 4/2001 | Havinis |
| 5,790,974 A | 8/1998 | Tognazzini | | 6,219,614 B1 | 4/2001 | Uchigaki et al. |
| 5,794,174 A | 8/1998 | Janky et al. | | 6,219,694 B1 | 4/2001 | Lazaridis et al. |
| 5,802,492 A | 9/1998 | DeLorme et al. | | 6,321,158 B1 | 11/2001 | DeLorme et al. |
| 5,806,018 A | 9/1998 | Smith et al. | | 6,332,127 B1 | 12/2001 | Bandera et al. |
| 5,808,566 A * | 9/1998 | Behr et al. ............. 340/995.12 | | 6,584,403 B2 | 6/2003 | Bunn |
| 5,809,247 A | 9/1998 | Richardson et al. | | | | |
| 5,809,415 A * | 9/1998 | Rossmann ............... 455/422.1 | | FOREIGN PATENT DOCUMENTS | | |
| 5,815,683 A | 9/1998 | Vogler | | EP | 0 569 243 A1 | 11/1993 |
| 5,819,227 A | 10/1998 | Obuchi | | EP | 0 675 341 A1 | 10/1995 |
| 5,864,305 A | 1/1999 | Rosenquist | | EP | 0 771 686 A2 | 5/1997 |
| 5,908,464 A | 6/1999 | Kishigami et al. | | JP | H04-261576 | 9/1992 |
| 5,917,405 A | 6/1999 | Joao | | JP | 6-289118 | 10/1994 |
| 5,919,239 A | 7/1999 | Fraker et al. | | JP | 6-294659 | 10/1994 |
| 5,919,246 A | 7/1999 | Waizmann et al. | | JP | 7-36382 | 2/1995 |
| 5,926,118 A | 7/1999 | Hayashida et al. | | JP | 07-262493 | 10/1995 |
| 5,929,774 A | 7/1999 | Charlton | | JP | H08-110231 | 4/1996 |
| 5,938,721 A | 8/1999 | Dussell et al. | | WO | WO 96/07110 | 3/1996 |
| 5,941,933 A * | 8/1999 | Miyake et al. ............... 701/208 | | WO | WO 97/07467 | 2/1997 |
| 5,946,626 A | 8/1999 | Foladare et al. | | WO | WO97/13657 A1 | 4/1997 |
| 5,950,173 A | 9/1999 | Perkowski | | | | |
| 5,963,956 A | 10/1999 | Smartt | | | | |
| 5,982,298 A | 11/1999 | Lappenbusch et al. | | | | |
| 5,987,381 A | 11/1999 | Oshizawa | | | | |
| 5,987,394 A | 11/1999 | Takakura et al. | | | | |
| 5,999,124 A | 12/1999 | Sheynblat | | | | |
| 5,999,877 A | 12/1999 | Takahashi et al. | | | | |
| 6,006,161 A | 12/1999 | Katou | | | | |
| 6,009,355 A | 12/1999 | Obradovich et al. | | | | |
| 6,021,371 A * | 2/2000 | Fultz ........................ 701/200 | | | | |
| 6,028,550 A | 2/2000 | Froeberg et al. | | | | |
| 6,047,234 A | 4/2000 | Cherveny et al. | | | | |
| 6,047,327 A | 4/2000 | Tso et al. | | | | |
| 6,075,874 A | 6/2000 | Higashikubo et al. | | | | |
| 6,087,965 A | 7/2000 | Murphy | | | | |
| 6,091,956 A | 7/2000 | Hollenberg | | | | |
| 6,092,076 A | 7/2000 | McDonough et al. | | | | |
| 6,107,944 A | 8/2000 | Behr et al. | | | | |
| 6,115,669 A | 9/2000 | Watanabe et al. | | | | |
| 6,119,066 A | 9/2000 | Sugiura et al. | | | | |

OTHER PUBLICATIONS

Response to Office Action mailed Sep. 13, 2006 for Reexamination U.S. Appl. No. 90/007,895, filed Jan. 23, 2006, entitled "Personal Communication System To Send And Receive Voice Data Positioning Information", inventor Michael L. Obradovich, Response mailed Nov. 13, 2006 (22 pgs.).

Statement of Substance of the Interview for Reexamination U.S. Appl. No. 90/007,895, filed Jan. 23, 2006, entitled "Personal Communication System To Send And Receive Voice Data Positioning Information", inventor Michael L. Obradovich, et al., Statement mailed Dec. 7, 2006 (4 pgs.).

Krebs, Michelle, "Cars That Tell You Where To Go", The New York Times, Sec. 11, p. 1, col. 1, Dec. 15, 1996 (4 pgs.).

Edmondson, Paul R., "The Global Positioning System—Direction for the Future", Tech Directions, vol. 55, Issue 9, p. 18, Apr. 1996 (5 pgs.).

Office Action issued in Reexamination U.S. Appl. No. 90/007,895, filed Jan. 23, 2006, entitled "Personal Communication System To Send And Receive Voice Data Positioning Information", inventor Michael L. Obradovich, et al., Office Action mailed Feb. 15, 2006 (10 pgs.).

Request For Ex Parte Reexamination Under 37 C.F.R. § 1.510 for Reexamination U.S. Appl. No. 90/007,895, filed Jan. 23, 2006, entitled "Personal Communication System To Send And Receive Voice Data Positioning Information", inventor Michael L. Obradovich, et al., Request mailed Jan. 23, 2006 (23 pgs.).

Matthews, James R., "Litigation Search Report CRU 3999" in connection with Reexam Control No. 90/007,895 to Doug Hutton, dated Jul. 13, 2006 (47 pgs.).

"OnStar" brochure by General Motors Corp., 1997, 12 pgs.

*American Calcar, Inc. v. BMW of North America, LLC*, United States District Court, Southern District of California, Civil Action No. '04 CV00614 DMS (LSP), "BMWNA's Opening Claim Construction Brief", filed Apr. 15, 2005, 39 pgs.

*American Calcar, Inc. v. BMW of North America, LLC*, Southern District of California, Civil Action No. '04 CV00614 DMS (LSP), "Declaration of Russell B. Hill In Support of BMWNA's Opening Claim Construction Brief", filed Apr. 15, 2005, 34 pgs.

*American Calcar, Inc. v. BMW of North America, LLC*, United States District Court, Southern District of California, Civil Action No. '04 CV00614 DMS (LSP), "Plaintiff's Opening Claim Construction Brief", filed Apr. 15, 2005, 76 pgs.

*American Calcar, Inc. v. BMW of North America, LLC*, United States District Court, Southern District of California, Civil Action No. '04 CV00614 DMS (LSP), "Joint Claim Construction Chart", filed Apr. 15, 2005, 27 pgs.

*American Calcar, Inc. v. BMW of North America, LLC*, United States District Court, Southern District of California, Civil Action No. '04 CV00614 DMS (LSP), "BMWNA's Opposition to ACI's Opening Claim Construction Brief", filed Apr. 29, 2005, 22 pgs.

*American Calcar, Inc. v. BMW of North America, LLC*, United States District Court, Southern District of California, Civil Action No. '04 CV00614 DMS (LSP), "Supplemental Declaration of Russell B. Hill In Support of BMWNA's Opposition to ACI's Opening Claim Construction Brief", filed Apr. 29, 2005, 3 pgs.

*American Calcar, Inc. v. BMW of North America, LLC*, United States District Court, Southern District of California, Civil Action No. '04 CV00614 DMS (LSP), "Notice of Document Discrepancies", filed May 3, 2005, 1 pg.

*American Calcar, Inc. v. BMW of North America, LLC*, United States District Court, Southern District of California, Civil Action No. '04 CV00614 DMS (LSP), "Plaintiff's Opposition Brief in Response to Defendant's Opening Claim Construction Brief", filed May 3, 2005, 37 pgs.

*American Calcar, Inc. v. BMW of North America, LLC*, United States District Court, Southern District of California, Civil Action No. '04 CV00614 DMS (LSP), "Joint Stipulation Regarding Construction of "Communication Means" in Claim 26 of U.S. Patent No. 6,148,261", filed May 27, 2005, 3 pgs.

*American Calcar, Inc. v. BMW of North America, LLC*, United States District Court, Southern District of California, Civil Action No. '04 CV00614 DMS (LSP), "Order Construing Patent Claims", filed Jun. 1, 2005, 21 pgs.

*American Calcar, Inc. v. BMW of North America, LLC*, United States District Court, Southern District of California, Civil Action No. '04 CV00614 DMS (CAB), "Memorandum of Points and Authorities in Support of BMWNA's Motion for Summary Judgment of Non-Infringement of US Patent No. 6,148,261", filed Jan. 23, 2006, 23 pgs.

*American Calcar, Inc. v. BMW of North America, LLC*, United States District Court, Southern District of California, Civil Action No. '04 CV00614 DMS (CAB), "Reply of Defendant and Counterclaimant, BMW of North America, LLC in Support of Its Motion for Summary Judgment of Non-Infringement of U.S. Patent No. 6,148,261", filed Feb. 23, 2006, 11 pgs.

*American Calcar, Inc. v. BMW of North America, LLC*, United States District Court, Southern District of California, Civil Action No. '04 CV00614 DMS (CAB), "Declarations of Wilfried Steins; Cindy Ryerson; Vlodek Olczak and Thomas M. Dunham Filed In Support of BMWNA's Motions for Summary Judgment", filed Feb. 23, 2006, 274 pgs.

*American Calcar, Inc. v. BMW of North America, LLC*, United States District Court, Southern District of California, Civil Action No. '04 CV00614 DMS (CAB), "American Calcar, Inc.'s Response and Objections to Newly Produced Evidence Offered by BMWNA In Support of Its Motions for Summary Judgment", filed Mar. 3, 2006, 19 pgs.

*American Calcar, Inc. v. (1) American Honda Motor Co., Inc. and (2) Honda of America Manufacturing, Inc.*, U.S. District Court for the Eastern District of Texas, Tyler Division, Civil Action No. 6:05cv475 (LED), "Original Complaint for Patent Infringement" (including civil cover sheet), filed Dec. 14, 2005, 11 pgs. (exhibits omitted).

AAA Map'n'Go Travel Package web pages, 7 pages.

Advertisement, "Collision Avoidance is Critical . . . Now it's Affordable," 1 page.

Advertisement, "Duats," 1 page.

Advertisement, "MFD 5200 Multi-Function Display," 1 page.

Advertisement, "Super Road Whiz", 2 pages.

Alcatel web pages, Alcatel, Nov. 24, 1998 (58 pages).

BigYellow web pages, 6 pages.

Bishop, "The Final Stop Remember IVHS?", *ITS World*, Jul./Aug. 2000 (pp. 14-15).

DineNet web pages, 19 pages.

Demmler, "Another Car Navagation System," *Automotive Engineering*, Jun. 1996, pp. 87, 89, pages.

Desmond, "Malone Again," *Fortune Cover Stories*, Publication Date Feb. 16, 1998, p. 66, 68 & 69.

Geosystems, Corporate web pages, Corporate Backgrounder, 14 pages.

Geosystems, Home and Corporate web pages, 4 pages.

Geosystems, Products and MapRoom web pages, Products & Services, 23 pages.

Giga Information Group, Inc. web pages, Giga Information Group, Inc. Nov. 24, 1998 (4 pages).

Global Map 2000 web pages, 6 pages.

Heuchert, "Eyes Forward: an Ergonomic Solution to Driver Information Overload," *Automotive Engineering*, Sep. 1996, pp. 27-31, 5 pages.

Jewett, "Toyota Offers Navigation System as U.S. Option," *Automotive News*, Nov. 18, 1996, p. 16, 2 pages.

Kelley, "Traffic Control Traffic Data, Unplugged", *ITS World*, Jul./Aug. 2000 (pp. 28-30).

Maps On Us web pages, 14 pages.

Maps On Us web pages, Search Categories, 14 pages.

Mapquest web pages, 1 page.

Metricom in the News, web pages, Metricom, Inc., Nov. 24, 1998 (8 pages).

McDonald, "Course 122—GPS Fundamentals & Applications", *Navtech Seminars & GPS Supply, Inc.*, Catamaran Resort Hotel, San Diego, CA, Mar. 22-23, 1999 (336 sheets).

Monet (Mobile Network), 2 pages.

Nokia 9000 Communicator web pages, 16 pages.

Noriyuki, "Just Think of It as a Big Eye in the Sky . . . Watching," *Los Angeles Times*, Section E, pp. 1, 8, Apr. 27, 1997, 2 pages.

Sedgwick, "Butterfly gives clue to cars of tomorrow", *Automotive News*, Oct. 28, 1996, p. 43, 2 pages.

Spyglass web pages, Spyglass, Nov. 24, 1998 (58 pages).

Steve Dye with Dr. Frank Baylin, The GPS Manual Principles and Applications, "Land Navigation Markets—Overview", Feb. 1997, ISBN:0-917893-29-8, 23 pages.

Think Thin, PC Magazine, Dec. 1, 1998 (p. 9).

"Trimble Demonstrates Trimconnect," *Flying*, Jul. 1997, p. 51, 1 page.

Wolk, "Microsoft unveils plans for car dashboard computer," *Reuters Article*, Copyright date 1998.

WorldPages web pages, 5 pages.

Yamaguchi, "Honda In-car Navigation System for the U.S.," *Automotive Engineering*, Jun. 1996, pp. 82-84, 3 pages.

Yoshikazu "Intelligent Car—History and the Future in Japan and Toyota," *Toyota Motor Corporation 98C015*, 5 pages.

Supplementary European Search Report for European Application No. 98930417.5-2213, search dated Apr. 23, 2004 and mailed May 4, 2004, 3 pages.

1996 Acura RL Navigation Manual (57 pgs.).

*American Calcar, Inc.* v. *American Honda Motor Co., Inc.* and *Honda of America Mfg., Inc.*, United States District Court, Southern District of California, Civil Action No. 06-2433-DMS (CAB), "Memorandum of Points and Authorities in Support of American Honda's Motion for Summary Judgment of Invalidity of United States Patents Nos. 6,148,261 and 6,529,924", dated Dec. 3, 2007 (23 pgs.).

*American Calcar, Inc.* v. *American Honda Motor Co., Inc.* and *Honda of America Mfg., Inc.*, United States District Court, Southern District of California, Civil Action No. 06-2433-DMS (CAB), "Declaration of Michael M. Rosen in Support of American Honda's Motion for Summary Judgment of Invalidity of the 6,148,261 and 6,529,824 Patents", dated Dec. 3, 2007 (4 pgs.).

*American Calcar, Inc.* v. *American Honda Motor Co., Inc.* and *Honda of America Mfg., Inc.*, United States District Court, Southern District of California, Civil Action No. 06-2433-DMS (CAB), "American Honda's Notice of Motion and Motion for Summary Judgment of Invalidity of United States Patents Nos. 6,148,261 and 6,529,924", dated Dec. 3, 2007 (3 pgs.).

*American Calcar, Inc.* v. *American Honda Motor Co., Inc.* and *Honda of America Mfg., Inc.*, United States District Court, Southern District of California, Civil Action No. 06-2433-DMS (CAB), "Expert Report of Scott Andrews", dated Oct. 17, 2007 (222 pgs.).

*American Calcar, Inc.* v. *American Honda Motor Co., Inc.* and *Honda of America Mfg., Inc.*, United States District Court, Southern District of California, Civil Action No. 06-2433-DMS (CAB), Plaintiff American Calcar, Inc.'s Opposition to American Honda's Motion for Summary Judgment of Invalidity of U.S. Patent Nos. 6,148,261 and 6,529,824, dated Feb. 1, 2008 (17 pgs.).

*American Calcar, Inc.* v. *American Honda Motor Co., Inc.* and *Honda of America Mfg., Inc.*, United States District Court, Southern District of California, Civil Action No. 06-2433-DMS (CAB), Declaration of Edward R. Tempesta in Support of Plaintiff American Calcar, Inc.'s Opposition to American Honda's Motion for Summary Judgment of Invalidity of U.S. Patent Nos. 6,148,261 and 6,529,824, dated Feb. 1, 2008 (20 pgs.).

*American Calcar, Inc.* v. *American Honda Motor Co., Inc.* and *Honda of America Mfg., Inc.*, United States District Court, Southern District of California, Civil Action No. 06-2433-DMS (CAB), "American Honda Motor Co., Inc.'s Reply to American Calcar, Inc.'s Opposition to American Honda's Motion for Summary Judgment of Invalidity of United States Patents Nos. 6,148,261 and 6,529,824", dated Feb. 15, 2008 (12 pgs.).

*American Calcar, Inc.* v. *American Honda Motor Co., Inc.* and *Honda of America Mfg., Inc.*, United States District Court, Southern District of California, Civil Action No. 06-2433-DMS (CAB), Declaration of Michael M. Rosen in Support of American Honda's Reply to American Calcar, Inc.'s Opposition to American Honda's Motion for Summary Judgment of Invalidity of U.S. Patents Nos. 6,148,261 and 6,529,824, dated Feb. 15, 2008 (69 pgs.).

Office Action from Japanese Patent Office dated Apr. 22, 2008 for Japanese application No. 11-504866.

* cited by examiner

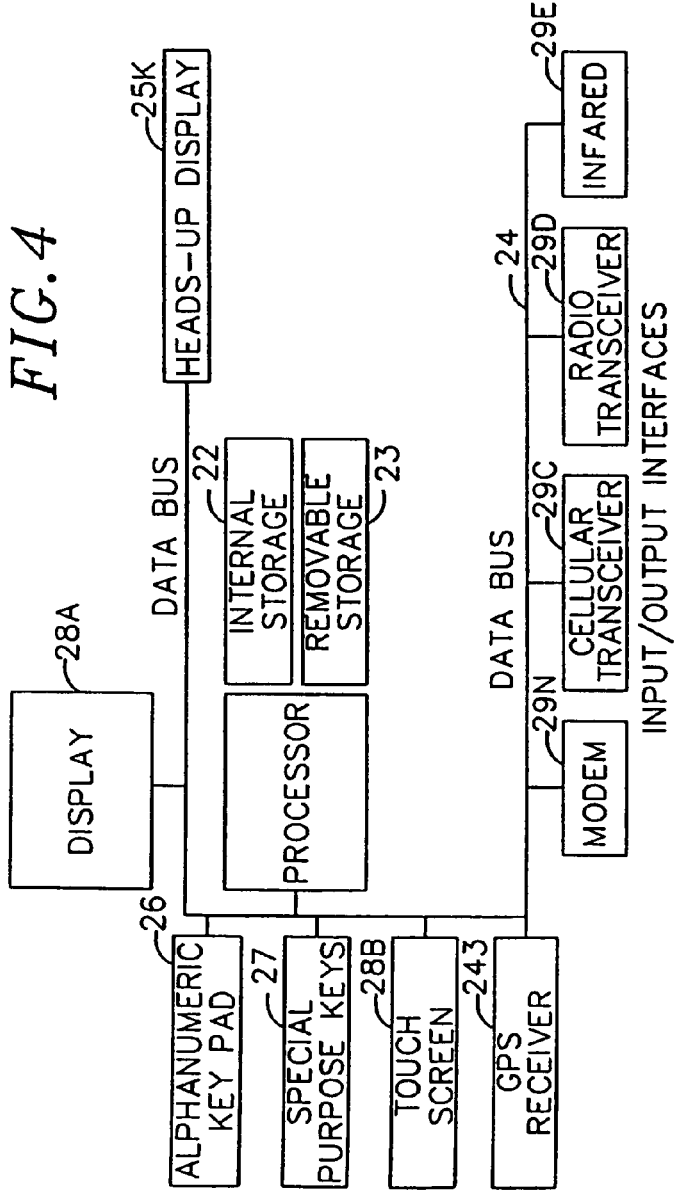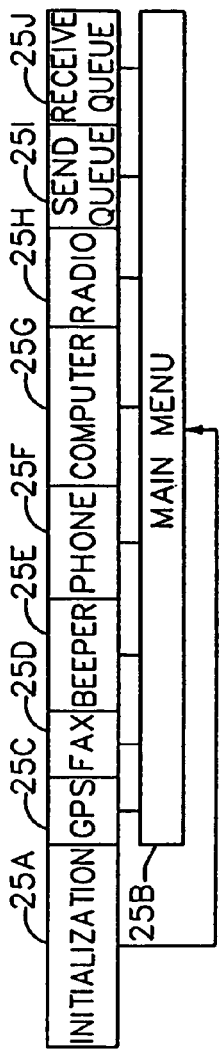

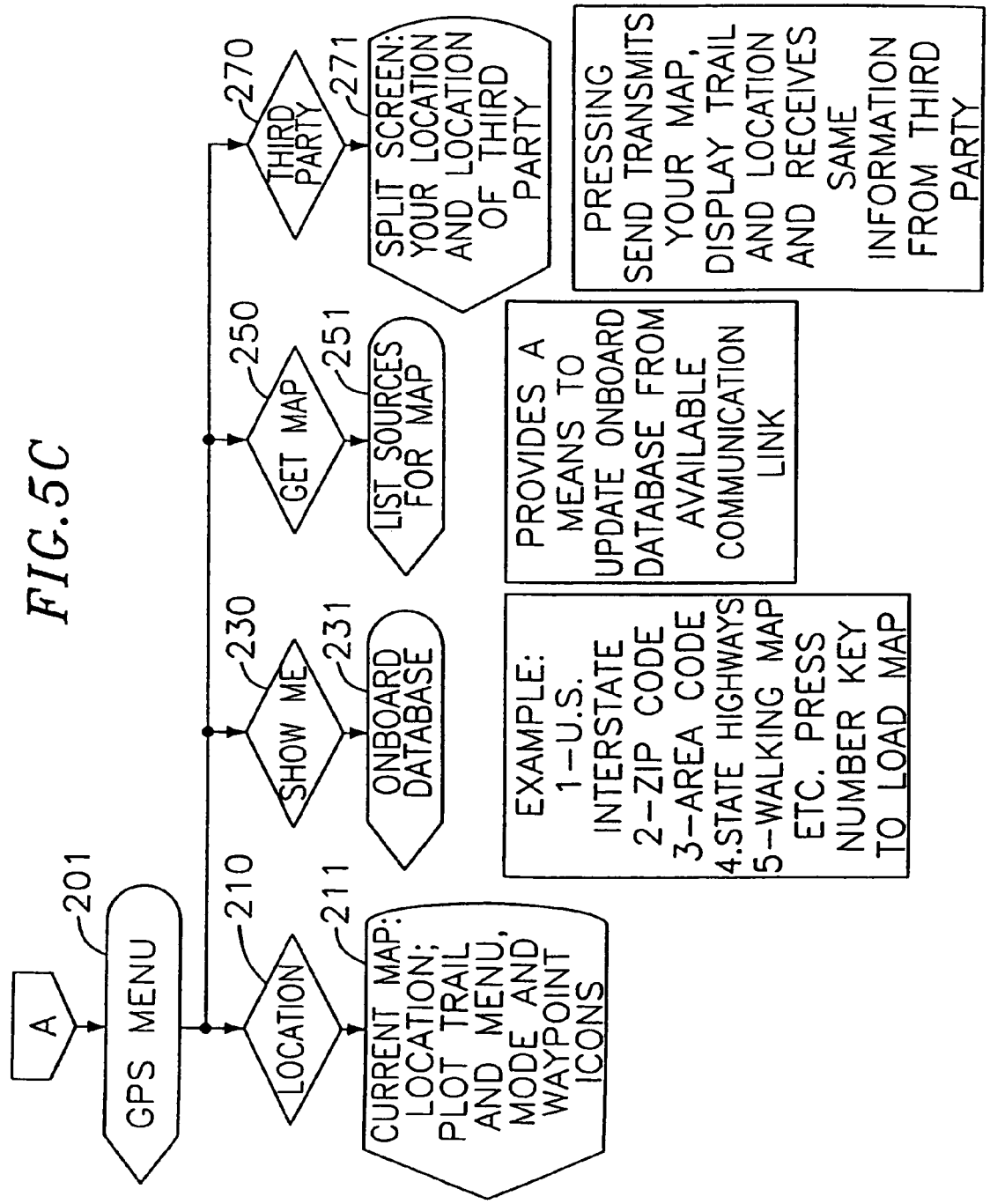

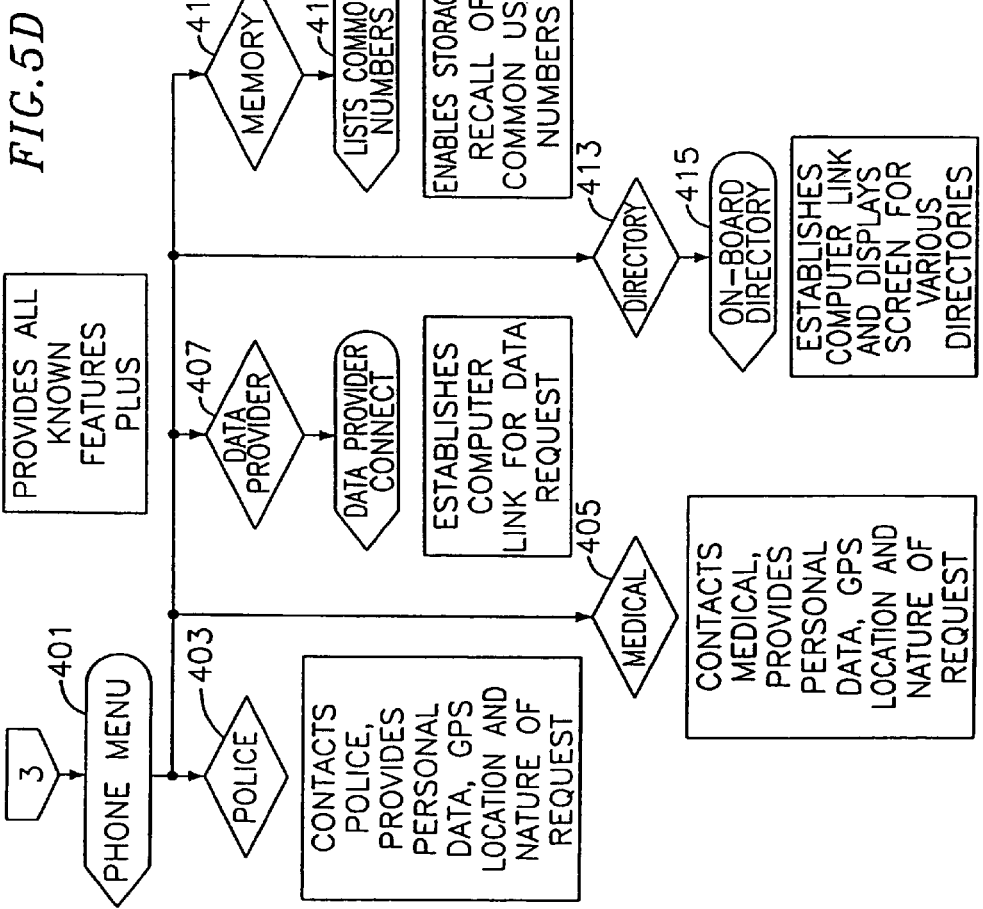

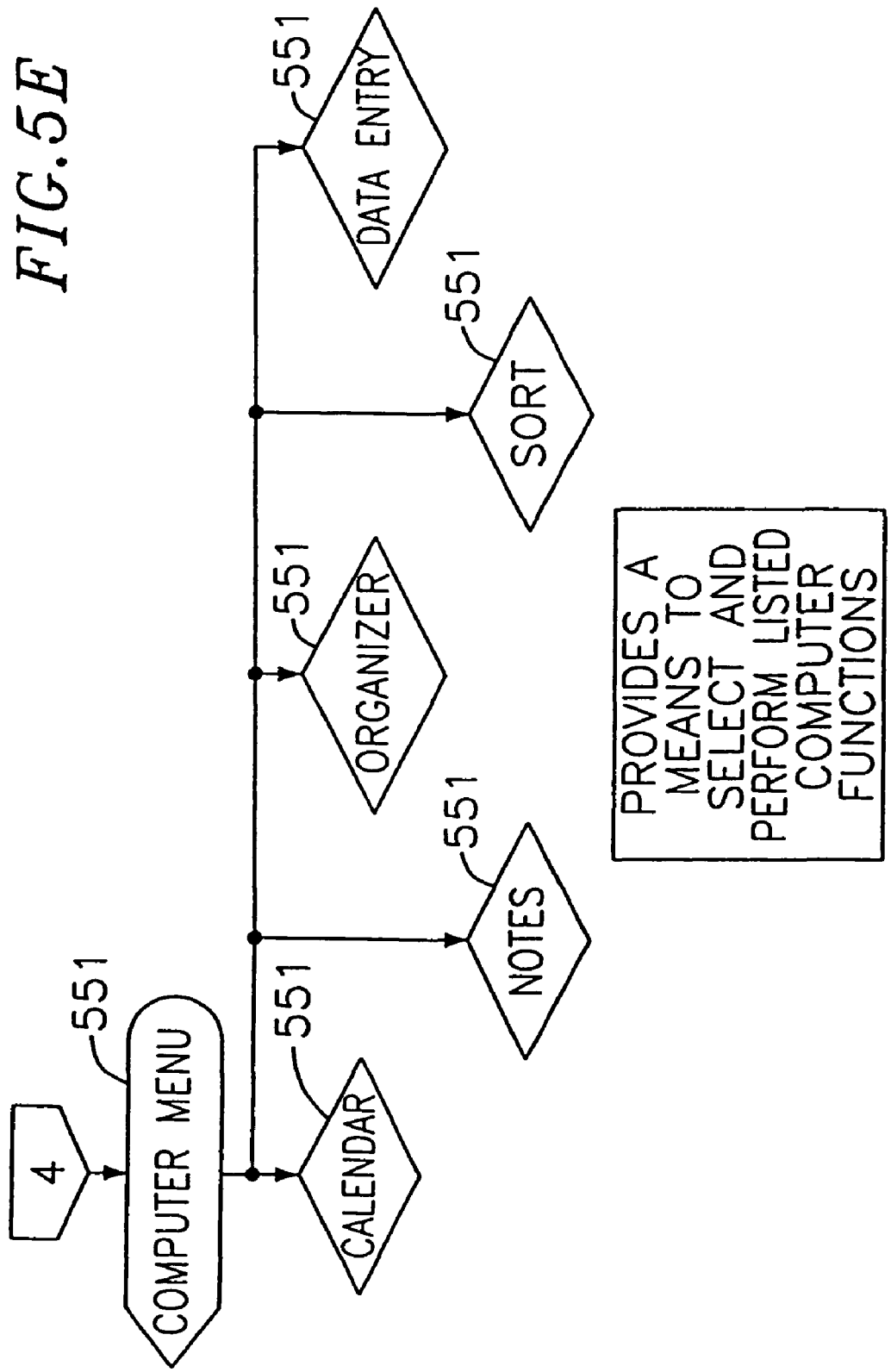

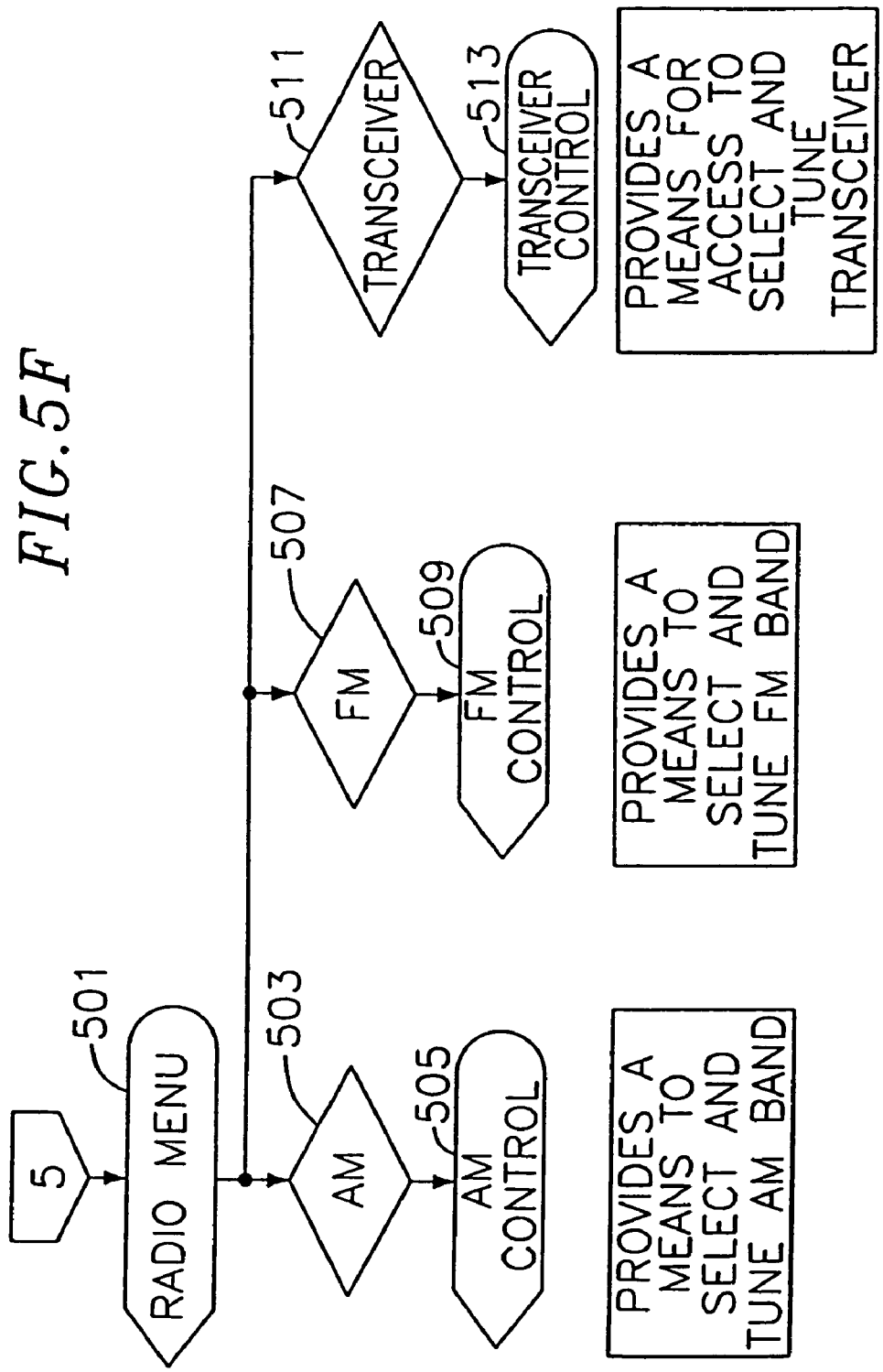

FIG. 20

| LISTING / NAME / WAYPOINT | ADDRESS | CITY | STATE | PHONE NO | GPS LOCATION NORTH | GPS WEST | WAYPOINT |
|---|---|---|---|---|---|---|---|
| ALEX'S GERMAN-AMERICAN RESTAURANT | 2801 S. EL CAMINO REAL | SAN CLEMENTE | CA | 714-492-8986 | 33°24.60 | 117°36.25 | 1 |
| ANTOINE'S CAFE | 218 S. EL CAMINO REAL | SAN CLEMENTE | CA | 714-492-1763 | 33°25.40 | 117°37.38 | 2 |
| BAKERS'S SQUARE RESTAURANT & PIES | 610 CAMINO DE LOS MARES | SAN CLEMENTE | CA | 714-661-3100 | 33°27.80 | 117°39.60 | 3 |
| BEACH GARDEN CAFE | 618 1/2 AVENIDA VICTORIA | SAN CLEMENTE | CA | 714-498-8145 | 33°25.35 | 117°37.36 | 4 |
| BOOTLEGGERS GRILL & SPEAKEASY | 111 AVE. PALIZADA | SAN CLEMENTE | CA | 714-361-8658 | 33°25.65 | 117°37.85 | 5 |
| BURBON STREET SANDWICHERY | 430 N. EL CAMINO REAL | SAN CLEMENTE | CA | 714-492-7827 | 33°25.58 | 117°37.76 | 6 |
| BURGER STOP | 524 AVENIDA PICO | SAN CLEMENTE | CA | 714-492-2350 | 33°25.92 | 117°37.12 | 7 |
| BURRITO BASKET, THE | 2017 S. EL CAMINO REAL | SAN CLEMENTE | CA | 714-498-5002 | 33°25.10 | 117°36.34 | 8 |
| CAFE CALYPSO | 114 AVENIDA DEL MAR | SAN CLEMENTE | CA | 714-366-9346 | 33°25.42 | 117°37.42 | 9 |
| CAFE EXPRESSO | 641 CAMINO DE LOS MARES | SAN CLEMENTE | CA | 714-240-3467 | 33°25.81 | 117°37.31 | 10 |
| CAPTAIN CULVER COUNTERCULTURE NATURAL FOODS | 149 AVENIDA DEL MAR | SAN CLEMENTE | CA | 714-498-8098 | 33°25.39 | 117°37.40 | 11 |
| CARL'S JR. RESTAURANT | 638 CAMINO DE LOS MARES | SAN CLEMENTE | CA | 714-493-0189 | 33°27.65 | 117°39.45 | 12 |
| CARL'S JR. RESTAURANT | 3929 S. EL CAMINO REAL | SAN CLEMENTE | CA | 714-498-5641 | 33°24.50 | 117°35.95 | 13 |
| CARROWS RESTAURANT | 620 AVENIDA PICO | SAN CLEMENTE | CA | 714-492-4290 | 33°25.85 | 117°37.10 | 14 |
| CHINA BEACH CANTEEN | 2369 S. EL CAMINO REAL | SAN CLEMENTE | CA | 714-492-6228 | 33°27.80 | 117°37.15 | 15 |
| CHINA WELL RESTAURANT | 620 CAMINO DE LOS MARES | SAN CLEMENTE | CA | 714-661-6813 | 33°27.61 | 117°39.42 | 16 |
| COCO'S FAMILY RESTAURANT | 2350 S. EL CAMINO REAL | SAN CLEMENTE | CA | 714-498-1542 | 33°24.90 | 117°36.18 | 17 |
| CORKY'S CAFE | 2727 VIA CASCADITA | SAN CLEMENTE | CA | 714-492-1135 | 33°25.10 | 117°37.48 | 18 |
| COURTSIDE RESTAURANT | 111 AVE. VISTA MONTANA | SAN CLEMENTE | CA | 714-361-2211 | 33°25.10 | 117°36.10 | 19 |
| DAVE'S MEXICAN RESTAURANT | 1701 N. EL CAMINO REAL | SAN CLEMENTE | CA | 714-492-7867 | 33°25.50 | 117°38.90 | 20 |
| DEL TACO | 109 CALLE DE INDUSTRIAS | SAN CLEMENTE | CA | 714-492-5311 | 33°25.51 | 117°36.50 | 21 |
| DENNY'S RESTAURANT | 529 AVENIDA PICO | SAN CLEMENTE | CA | 714-492-2382 | 33°25.48 | 117°36.15 | 22 |
| DOMINOES PIZZA | 1502 N. EL CAMINO REAL | SAN CLEMENTE | CA | 714-498-9002 | 33°25.25 | 117°37.50 | 23 |
| EASTERN WINDS | 201 N. EL CAMINO REAL | SAN CLEMENTE | CA | 714-492-3008 | 33°25.01 | 117°37.05 | 24 |
| EL CAMINO TACOS | 420 S. EL CAMINO REAL | SAN CLEMENTE | CA | 714-366-8358 | 33°25.10 | 117°37.25 | 25 |
| EL JEFE CAFE | 106 E. ESCALONES | SAN CLEMENTE | CA | 714-492-4010 | 33°25.25 | 117°37.03 | 26 |
| EL MIRADOR | 301 N. EL CAMINO REAL | SAN CLEMENTE | CA | 714-366-0855 | 33°25.08 | 117°37.10 | 27 |

GPS ENGINE — 53

| APPLICATION MODULE INTERFACE | | | |
|---|---|---|---|
| | ACCESS LATITUDE/LONGITUDE QUALITY CODES FOR BEST DISPLAY SCALES | | |
| LAYER SYSTEM | USE SPATIAL QUERY FUNCTIONS | | |
| LAYER PROTOCOL | USE CENTROID INTERPOLATION FUNCTIONS | | |
| ROUTE PLANNING | USE MATCH-RATE COMPARISON FUNCTIONS | | |
| HEADER PROTOCOL | | | |
| TAG TYPE | | | |
| LATITUDE/ LONGITUDE | | | |
| RADIUS | | | |
| MAP | | | |
| WAYPOINT LINKS | | | |
| ETC. | | | |

*Fig. 28*

PERSONAL COMMUNICATION SYSTEM TO SEND AND RECEIVE VOICE DATA POSITIONING INFORMATION

CROSS-REFERENCE TO RELATED APPLICATION

This application is a continuation of U.S. patent application Ser. No. 11/079,879 filed Mar. 14, 2005, which application is a continuation application of U.S. patent application Ser. No. 10/376,971, filed Feb. 27, 2003, now U.S. Pat. No. 6,868,335 entitled "PERSONAL COMMUNICATION SYSTEM FOR COMMUNICATING VOICE DATA POSITIONING INFORMATION", which application is a continuation of U.S. patent application Ser. No. 09/669,527, filed Sep. 25, 2000, now U.S. Pat. No. 6,529,824, which application is a divisional of U.S. patent application Ser. No. 08/879,955, filed Jun. 20, 1997, now U.S. Pat. No. 6,148,261.

FIELD OF THE INVENTION

The invention relates generally to a system for communicating data including global-positioning-encoded information. In particular, the present invention relates specifically to a device and system for communicating and retrieving position and position related data.

BACKGROUND OF THE INVENTION

Availability of up-to-date information is more important today than ever before and this will continue to be true for the foreseeable future. People want to be well informed, so much so that they travel with cellular phones, beepers, and even portable hand-held Global Positioning System (GPS) satellite receivers.

GPS capable devices generally have a GPS receiver for receiving satellite signals from the GPS satellite network that allow for determination of the device's position. Such devices allow for precisely locating the device in terms of latitude and longitude using the GPS receiver. Some devices have map data stored in memory and a display for showing the device position with reference to the map data. Other devices have no underlying map data base for reference. Rather, they show only the geographic coordinates of the device's location. These coordinates may be referred to as waypoints. Most GPS receiver devices can store many waypoints. Some GPS receiver devices can plot and display a trail of waypoints and store this trail for future retrieval. Sophisticated devices may compute the device's heading, speed, and other information based on comparisons with previous GPS determined positions.

GPS receiver devices with map display capability may store the map information on computer diskettes, CD-ROM's, or other computer memory storage devices. The device location may then be displayed on a display terminal with reference to a map stored in the computer memory storage device. The available quantity of map data, however, can overwhelm the memory capability of easily portable computer devices. This problem is exacerbated when additional information is included and linked with the map data. In addition, information is more valuable when it is up to date and available at the time of consumption, and such devices do not incorporate a means for updating the stored information. By way of example, a CD ROM could never maintain an up-to-date list of every 5-star restaurant.

Some GPS receiver devices have the ability to communicate over a telecommunications network. These devices do not provide for automatic or semi-automatic dynamic exchange of on-line position dependent or related information. In addition, these devices cannot communicate with third parties in the absence of a uniform data format standard. For example, a cellular-phone-based system comprising GPS location information working in conjunction with proprietary Public Safety Answering Point (PSAP) telephone equipment is known. The device provides personal and medical information on an emergency basis to the proper authorities. Such a device does not allow third parties to communicate, tag, interrogate, limit, designate, modify or share this information amongst themselves for any other use.

To that end, the ability to receive digital data structures with GPS encoding, and storing this information for eventual use or broadcast to third parties, would be valuable. Today, the U.S. and several other countries have independent publishers busily GPS mapping everything down to the most minute detail. Most of these data bases are available on CD ROM storage. The problem is that no one data base can contain enough information to fulfill the unique requests of every particular and picky consumer. The costs associated with providing and maintaining such a large data base would be overwhelming and over-burdening. Additionally, most consumers do not like reading or compiling vast data bases.

SUMMARY OF THE INVENTION

The system of the present invention comprises Personal Communications Devices (PCDs), and traditional computer systems with GPS engines, routers, and other application programs to request, process, and transmit tagged GPS encoded information. The system, with related applications, can be accessed by device users, traditional computer users, web-site users (cyberspace), data publishers, public or private enterprises or individuals, by means of application programs. The tagged GPS encoded data files can be stored or sent via communication links using AM, FM, spread spectrum, microwave, laser or light beam in free or fiber optic, line-of-sight, reflected, satellite, secure or non-secure, or any type of communications between multiple points that the application or the state-of-the-art may allow. The system is a waypoint tag and interrogation system using various protocols to answer requests and provide GPS-encoded information. The applications use GPS devices, engines, routing and encoding for access to specific requester-designated data retrieval requests. The applications access fax machines, beepers, telephones and other communication linked devices. The system accesses computer and storage systems with various applications in order to provide this information from a plurality of providers. The system thereby eliminates or reduces the need for large storage devices and interchangeable storage modules.

One embodiment of the present invention includes a requesting device, a data provider (hardware and software), a user, tagger applications or GPS engine and router system with protocols for encoding, tagging, modifying, interrogating, arranging, limiting, displaying, sorting, mapping, segregating, sending, receiving and updating waypoint and the waypoints connected data structures with digital or graphic maps, digital voice files, linked digital web files properly encoded and tagged by way of specific devices, or by traditional computer and storage systems.

The application programs contain protocols for users, providers, taggers, list maintenance organizations, and others, and will use a dynamic identification system from applications containing GPS search engines, route planners, compilers, designators, publishers, and others to permit communication of information.

The PCD is a cellular-phone-sized electronic device, combining the capabilities of a GPS receiver, transceiver, digital beeper, cell phone and projection system into one compact unit. The PCD is capable of uploading emergency information (medical, police alert, etc.) via a one-push button that phones 911 or a security monitoring center similar to those used for house alarms. The alert continues to be broadcast until a response is made.

The PCD is also capable of downloading information via a request to a data provider, similar to a request for directory information from a phone company or other service. In this mode the PCD acts similar to calling a phone operator for information. However, in this instance, no human contact is required The caller requests specific information (location of gas stations, names of restaurants, local banks, etc.) via a voice command ("Download e.g., Wells Fargo Banks") or via digital commands using a keypad or other input device and the requested information is automatically downloaded to and stored in the memory of the user's PCD. This information can be accessed off-line via the screen on the PCD. It is all done digitally, eliminating having to write down information such as name, address, location map, GPS latitude and longitude encoding, direction and distance to location, hours of operation, or other items of information. The PCD can be plugged into an automobile input port or similar device, if available, and provide distances and directions to locations of interest. Similar information of a condensed nature can also be provided to the user via the screen of the PCD. The user is not required to be a subscriber to some proprietary system, instead the PCD can use any means to access any data base from any potential provider, whether GPS encoded or not.

In some areas the information would be sent and received by way of a Local Area Broadcast via radio frequency signals to each home, car or PCD within a reception areas In such an embodiment, users are able to access companies listed on the broadcast network from data providers of properly tagged, yellow page-type information or are provided with GPS encoded information and maps similar to web page listings. This would be advantageous to small towns with little information available for travelers, but which have an interest in providing up-to-date traffic, weather and travel advisories to benefit the local community and businesses. Such a system does not require a master, home or base unit. The providers of data base or advertising information could be a single data provider and could also be individual users with application programs that allow provision of such data. The application programs provide a means for sending and receiving data, GPS encoded data and graphics encoded data The application programs can also act as a universal coder/decoder to other proprietary GPS data bases.

The present invention allows users to request detailed information relating to their present location as well as information related to distant locales. Some of the advantages provided by the invention include:

1. Information can be received digitally by a PCD user from any system.
2. Multiple requests can be retained, stored or resent.
3. In-depth dynamic data retrievals are possible and could be viewed later.
4. GPS tagging and encoding with latitude and longitude information along with encoded maps for navigation.
5. Small non-contiguous map segments are possible.
6. On-line storage of data personal and other information, along with GPS encoded maps on some data files.
7. Display menus, interfaces and applications can be viewed on heads-up display systems in automobiles, homes, businesses and various commercial applications.
8. Allows for portable Internet access.
9. Provides a means for an Internet based telephone directory access tagged and linked to the originating area code and phone numbers.

Remote and distant third parties could communicate with each other and, by sending and receiving GPS encoded data, can meet or find each other in remote locations. Maps and other digital data may be transmitted/received by fax, beeper (receive only), computer, phone and radio.

One embodiment of this invention would include a system of non-subscribers communicating to each other in a similar fashion, without the use of base stations. In addition, the non-subscribers could send personal data bases with maps included, GPS information, and other information of non-related data or graphics from publishers of any such data base. In this embodiment the device would act as a transceiver, sending and receiving dynamic moving waypoint information in digital formats, including maps of various sizes and embodiments.

The PCD can display a singular or a plurality of images and displays, project an image on to a screen or viewing surface, store or communicate data (depicted as a line, graphic, icon, etc.) to and/or receive latitude and longitude data from third parties. Additionally, the device can send/receive latitude- and longitude-encoded maps and other data to/from a third party, send/receive standard or non-standard phone and fax communications (AM, FM, spread spectrum, microwave, laser or light beam in free or fiber optic, line of sight, reflected, satellite, secure or non-secure, or any type of communications between two points that the application or state-of-the-art may allow), perform computer functions from existing application software and operating systems, receive standard or non-standard beeper messages, interface with a conventional computer and provide an interface to a heads-up display, an external viewing device or any projection system.

An embodiment of this invention incorporates a GPS transceiver with a designated application used with a communication system or network. Several users of this invention can communicate and send data, maps and graphic files with or without GPS encoding. By example, a user could request from another party a map of walking trails of Yosemite Valley with latitude and longitude designations properly GPS encoded. This map may not be in the requesting user's data base or in a large number of subscriber's or non-subscriber's data bases. This highly stylized map and encoded information, of a possible non-uniform nature, could be on just one user's PCD device or external source. The requesting user could contact the specialized source for specific information, and be sent via a communication link, the specific data, this data could then be modified by the user and sent back to the original provider.

The preferred embodiment of the PCD and system provides a means for requesting and receiving data files which can be tagged, modified and interrogated. This data can be comprised of many different formats and applications with potentially unique compilations from potentially unrelated, (non)-subscribers or (non)-linked users. These users can communicate with commercial, business and personal computer systems and devices having the capability of running an application (or applications) and having the ability to request and provide waypoint information which can be tagged, modified and interrogated.

Another preferred embodiment of this invention provides a means for decoding tagged, modifiable and interrogatable maps and data files furnished by third parties for display on the user's PCD or traditional computer devices.

In one embodiment of the device and tagging system the GPS information is communicated from locations, homes, businesses, commercial designations, government resources, public and private areas, cyberspace and other communication systems. Various designated locations, or a plurality and multiplicity of locations, or data structures, are assigned as waypoints. These waypoints could be tagged, or interrogated from an application program which describes, encodes, reports, modifies and communicates this encoded information and data from any location. In addition, the transmitting device may report a plurality and multiplicity of locations or events unrelated to either the location of either the transmitting or receiving device. Indeed, the device could communicate to many unlinked, unreported or unconnected waypoints and send active dynamic information to the requester. Cyberspace providers may enter the network web system, use applications for device communications and participate in the exchange of information using designated GPS engines and applications. By way of example, the invention can provide a requester with dynamic advertisements encoded with maps, location information, or other data to a location anywhere in the U.S. Indeed, tagged files which are linked can be sent from a third-party publisher located in another state.

The system is similar to the world wide web, except the web does not use GPS engines, applications, tagging systems, etc. By way of example, one difference is that the invention uses GPS devices, engines, applications and encoding for access to specific requester designated data retrieval techniques. The invention provides a means to locate specific individuals or places using standard GPS search techniques.

The system includes the concept of storing data, including voice messages. The system encodes files for use in a location tagged data format system. Users can request and compile information and store the information on remote computer systems. Certain protocols for compilation, encoding and tagging data files may be desirable in order to create files for system usage.

An embodiment of the invention uses fax, beepers, telephones, and/or computer and storage systems with application programs to properly GPS encode, tag, modify and interrogate requests and provide same from a plurality of providers. An embodiment of the invention includes applications or GPS engine systems for encoding, tagging, modifying, interrogating, arranging, limiting, displaying, sorting, mapping, segregating, sending, receiving and updating waypoints and its connected data structures with maps, or by any other means by way of specific devices, or by traditional computer and storage systems.

Another advantage the invention provides is a means to display this type of information and a means to store data unrelated to any interrogation by the PCD device. Methods of display include multiple of displays including, by example, overhead displays, heads-up displays, projection systems, LCD displays, computer displays or any past or future designed displays whether connected directly or by some electromagnetic means. The preferred embodiment of the device could include any means of display or combinations thereof In addition, the device could include many control devices such as remote control, remote mouse type devices and any combination of keyboards.

Further objects, features and advantages of the invention will become apparent from the following detailed description taken in conjunction with the accompanying drawings showing an illustrative embodiment of the invention in which like parts are designated by like reference numerals throughout.

DESCRIPTION OF THE DRAWINGS

FIG. 4 is a block diagram of the PCD of FIG. 2;

FIG. 4A shows a screen menu hierarchy of the PCD of FIG. 2;

FIG. 5C illustrates a flow chart depicting the program sequence for the user to control the GPS mode of the PCD of FIG. 2;

FIG. 5D illustrates a flow chart depicting the program sequence for the user to control the phone mode of the PCD of FIG. 2;

FIG. 5E illustrates a flow chart depicting the program sequence for the user to control the computer mode of the PCD of FIG. 2;

FIG. 5F illustrates a flow chart depicting the program sequence for the user to control the radio mode of the PCD of FIG. 2;

FIG. 20 illustrates a typical listing downloaded from a data provider;

FIG. 28 illustrates a software module configuration of the GPS engine;

DETAILED DESCRIPTION OF THE INVENTION

Figure 1:
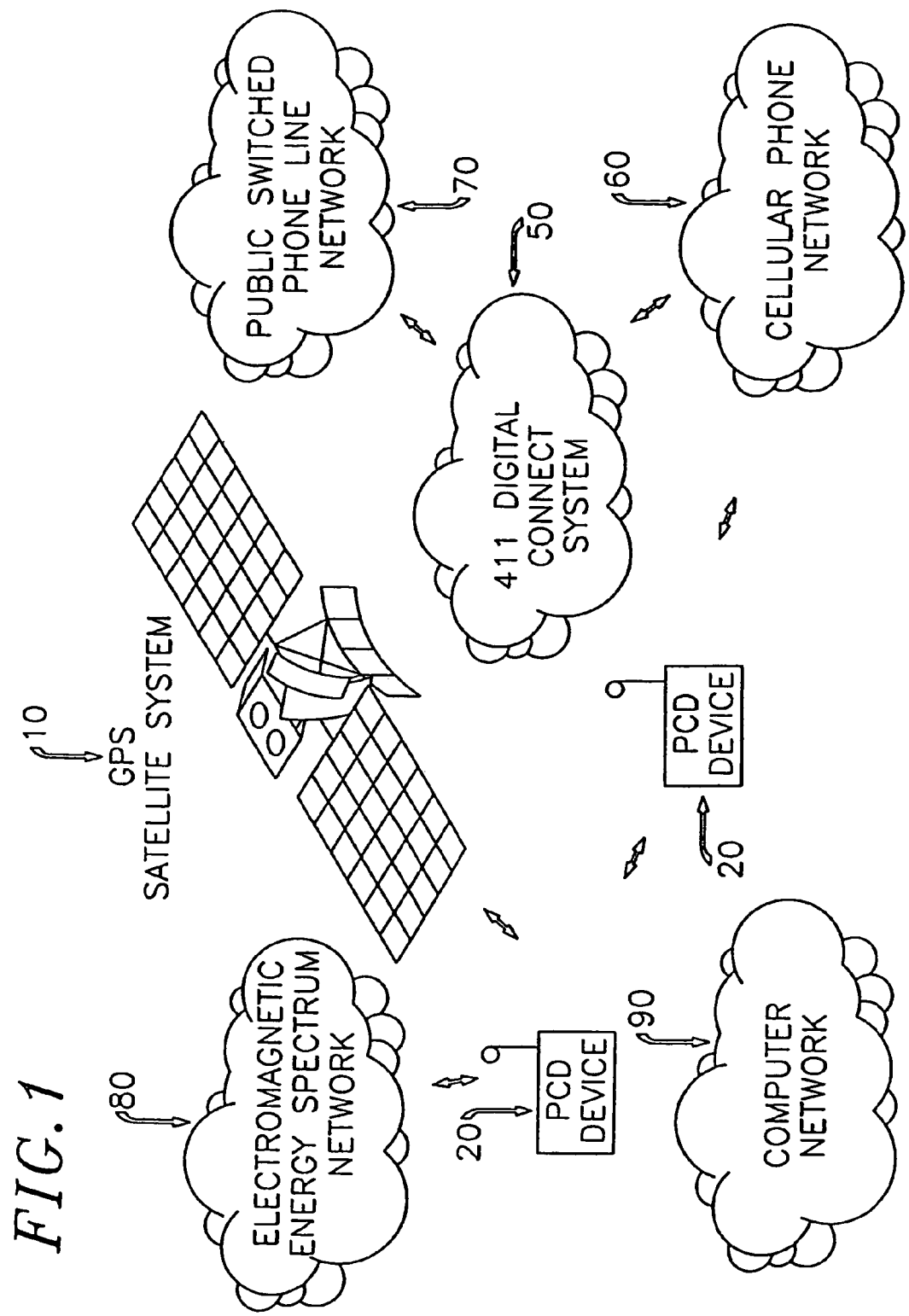
FIG. 1 illustrates a GPS transceiver system and communication links incorporating the present invention.

FIG. 1 shows a system capable of communicating using the electromagnetic energy spectrum, traditional computer networks, cellular phone networks, public telephone networks, and satellite system networks. The major components of the system comprises personal communication devices (PCDs) 20 and one or more of the following: a cellular phone network 60, a standard phone line network 70, an electromagnetic energy spectrum network 80 and/or a computer network 90. The PCD receives signals from a GPS satellite system 10.

Figure 2:
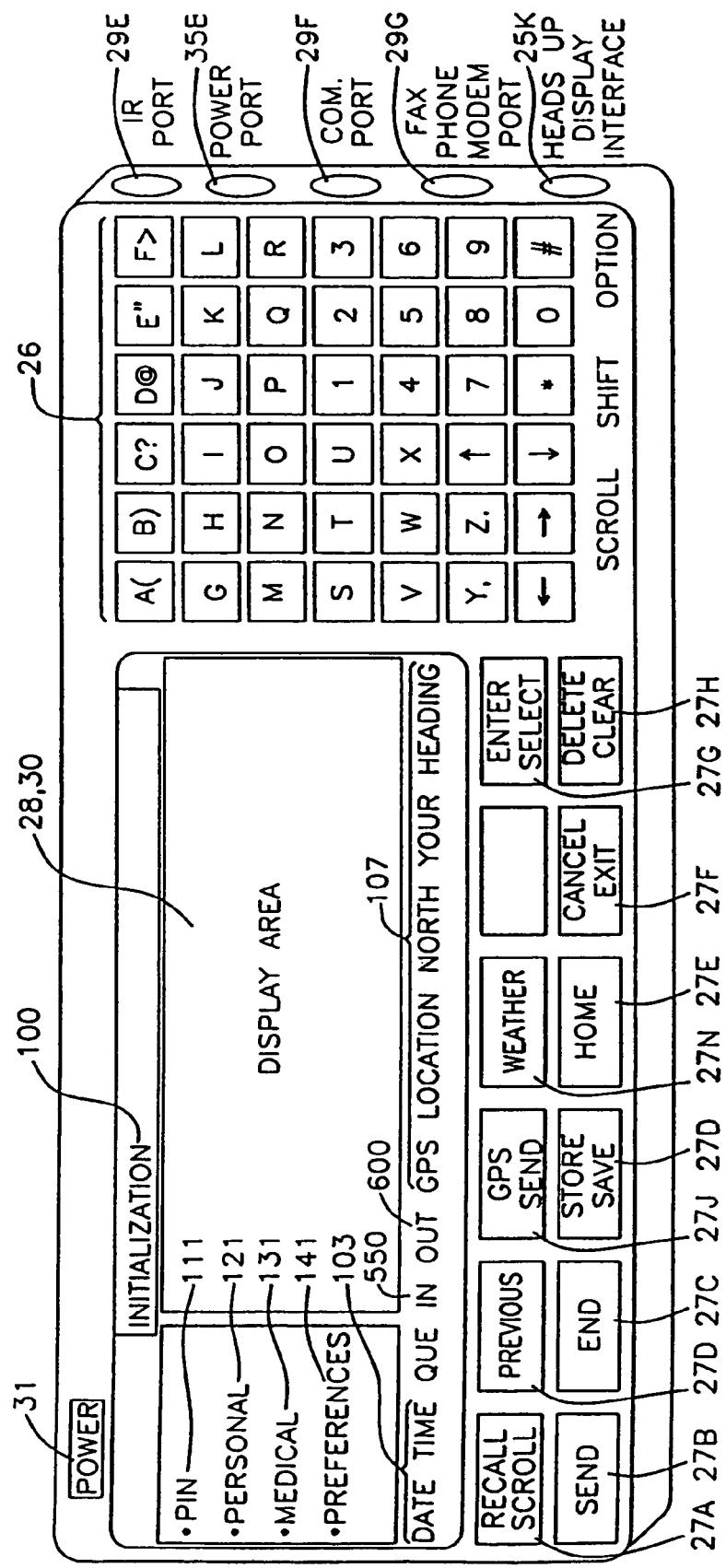
FIG. 2 is a front perspective view of a PCD of the present invention showing a layout of controls and an initialization screen.

FIG. 2 illustrates a PCD of the present invention. The PCD has a display 28a. The display may be of a LCD type or other types known in the art. Incorporated with the display is a touch screen input device 28b, which are known in the art. The PCD also has a alphanumeric key pad 26, which includes many of the standard keys generally found on computer keyboards. The location of the keys, and the selection of the characters used on a single key, may be varied as desired. The PCD also has specialized keys 27a-g, n related to GPS, telecommunications, and other functions. Located on one side of the PCD are a number of input and output ports. In the embodiment shown, these ports include a modem output port 29g, a generalized communication port 29f a power port 35b, an infrared port 29e, and a heads-up display interface port 25k. The location of these ports are shown for descriptive purposes only, the specific location of these ports on the PCD is not critical. The power port allows the PCD to be operated from an external power source (not shown). The communication port allows the PCD to be connected to printers, local computer networks, and the like.

Figure 3:
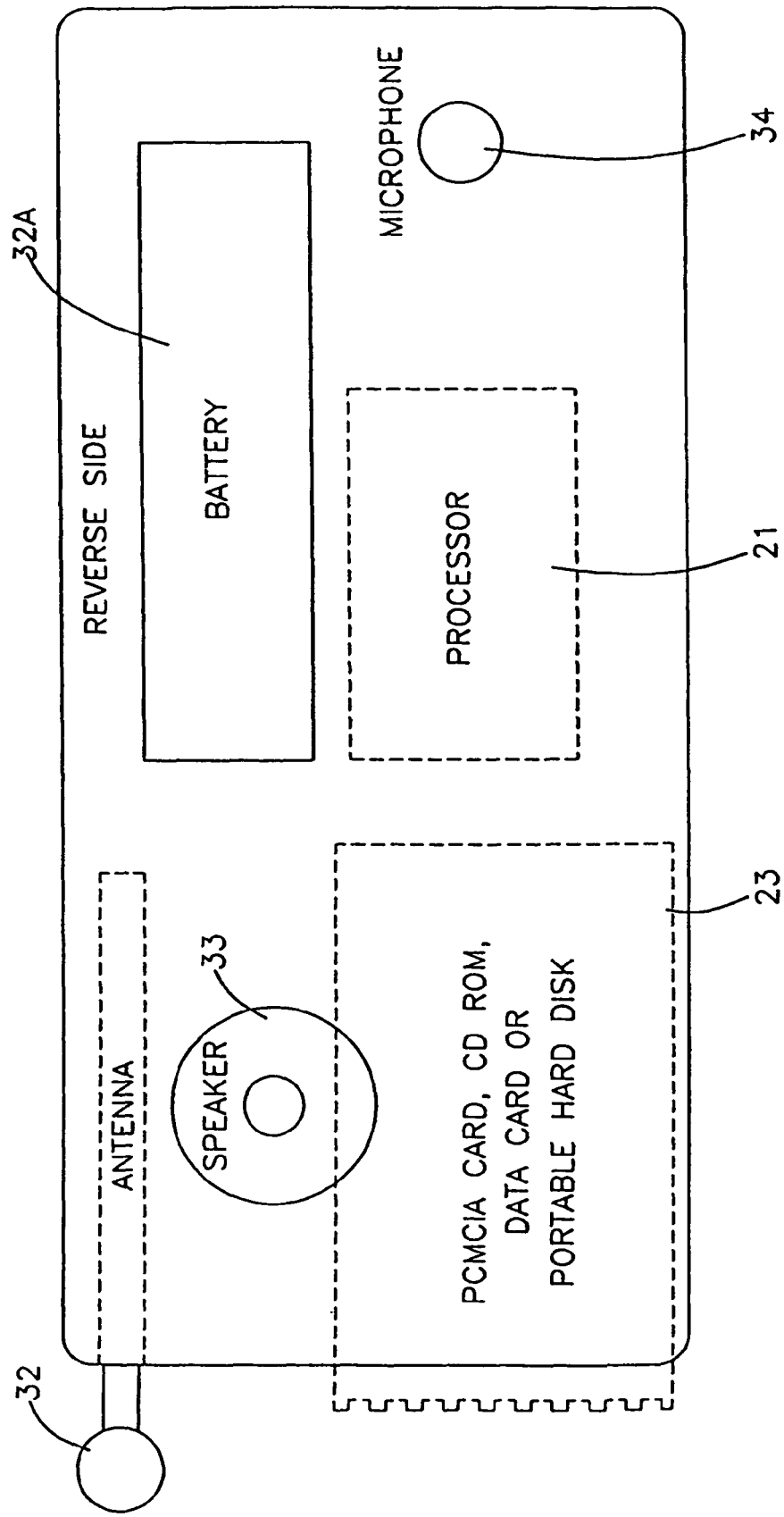
FIG. 3 is a rear view of the PCD of FIG. 2.

FIG. 3 shows a rear view of the PCD of FIG. 2. The rear of the PCD contains a microphone 34 towards one edge of the rear of the PCD and a speaker 33 towards the opposing edge. The layout of the microphone and the speaker is similar to that found in portable cellular telephones. An antenna 32 extends from the edge near the speaker to allow for communication in a cellular telephone network or via other electromagnetic spectrum means. The PCD contains a battery 38a. The battery allows for mobile operation of the PCD and is the selected power source if an external power source is not available through the power port. The PCD's operation is governed by a processor 21. A variety of microprocessors may be used, with the selection of such determined by processing power, power utilization, and other factors and requirements. The PCD has a slot 23 for a PCMCIA card, CD-ROM, or other computer accessory. The PCD is powered on when the power button 31 (shown in FIG. 2) is depressed. In the embodiment shown, at initial device power on, the processor causes the PCD to display the initialization screen 100 (shown in FIG. 2).

FIG. 4 shows a block diagram of the PCD. Control and logic functions are performed by the processor 21. Internal data storage 22, which is provided by conventional memory such as RAM or ROM or variations thereof, may be accessed by the processor. The processor may also access removable data storage devices 23 such as a hard disk installed via the PCMCIA slot, a CD-ROM type device or other similar removable data storage devices. The processor is connected by a data bus 24 to a number of devices. These include the alphanumeric key pad and other special purpose keys, the touch screen, and other hard wired input devices. The heads-up display output port and the display screen are also connected via the data bus to the processor, it being recognized that a number of display related devices such as VGA cards, chips, and the like are also required to implement the display device functions and the other previously mentioned functions. The microprocessor may also access or control communications with telephone networks, either hardwired or cellular, radio transmissions, infrared transmissions, or communications with other computer devices.

All known verbal commands from GPS systems can be implemented and attachment or inclusion of voice activation for map instructions relative to location, GPS and street designations, including heading descriptions, distance, and arrival time estimates can be included.

Figure 24:
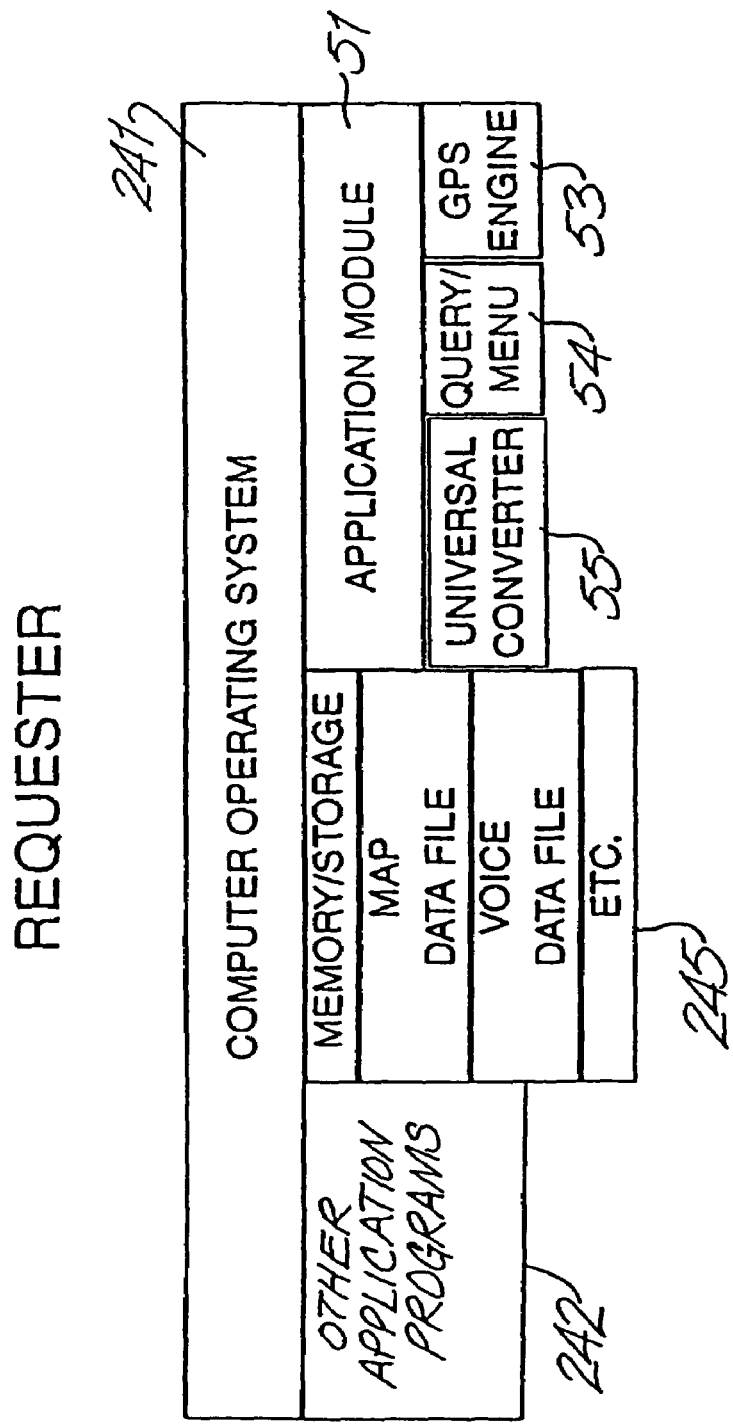
FIG. 24 illustrates a software module configuration of a requester.
Figure 25:
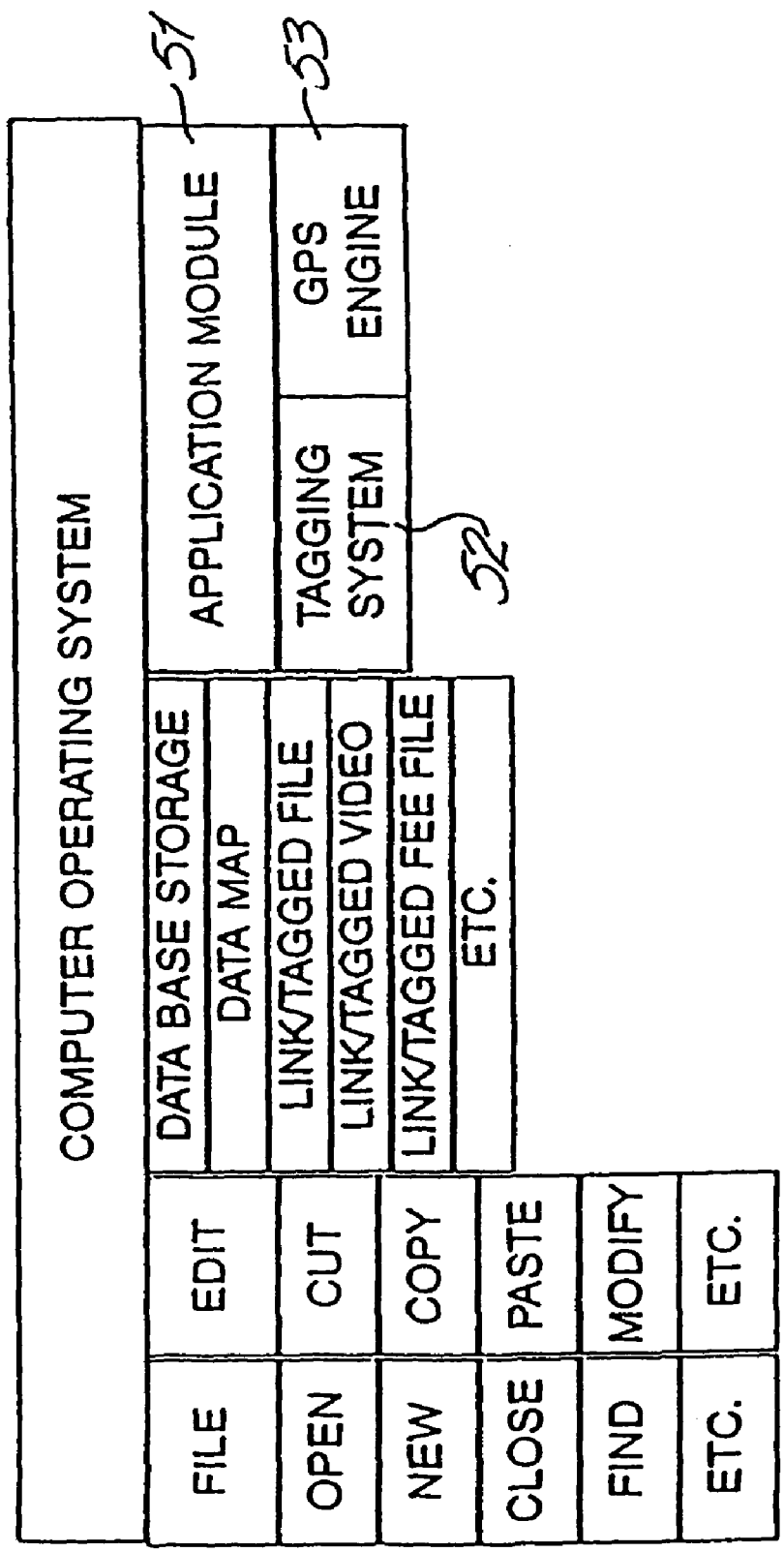
FIG. 25 illustrates a software module configuration of a provider.

FIG. 24 illustrates a block diagram of the PCD's software components. An application module or program 51 interfaces with the PCD's operating system 241. The operating system may be DOS, UNIX, Windows 95, Windows NT, O/S2 Apple McIntosh, Next Computer, or other operating systems, including operating systems well suited to devices with constrained memory or other limitations due to the small physical size of the PCD. The operating system additionally interfaces with other application programs 242 that provide standard file edit and other functions typically found in personal computers. The operating system, or other application programs interfacing with the operating system, provide for maintenance of data bases 245 used by the PCD. The application module includes a GPS engine 53 providing GPS functions, including interfacing with the GPS receiver 243 (shown in FIG. 4). A query menu program 54 of the application module controls the graphical user interface and related functions for the device. Included in the application module is a universal converter 55.

Figure 29:
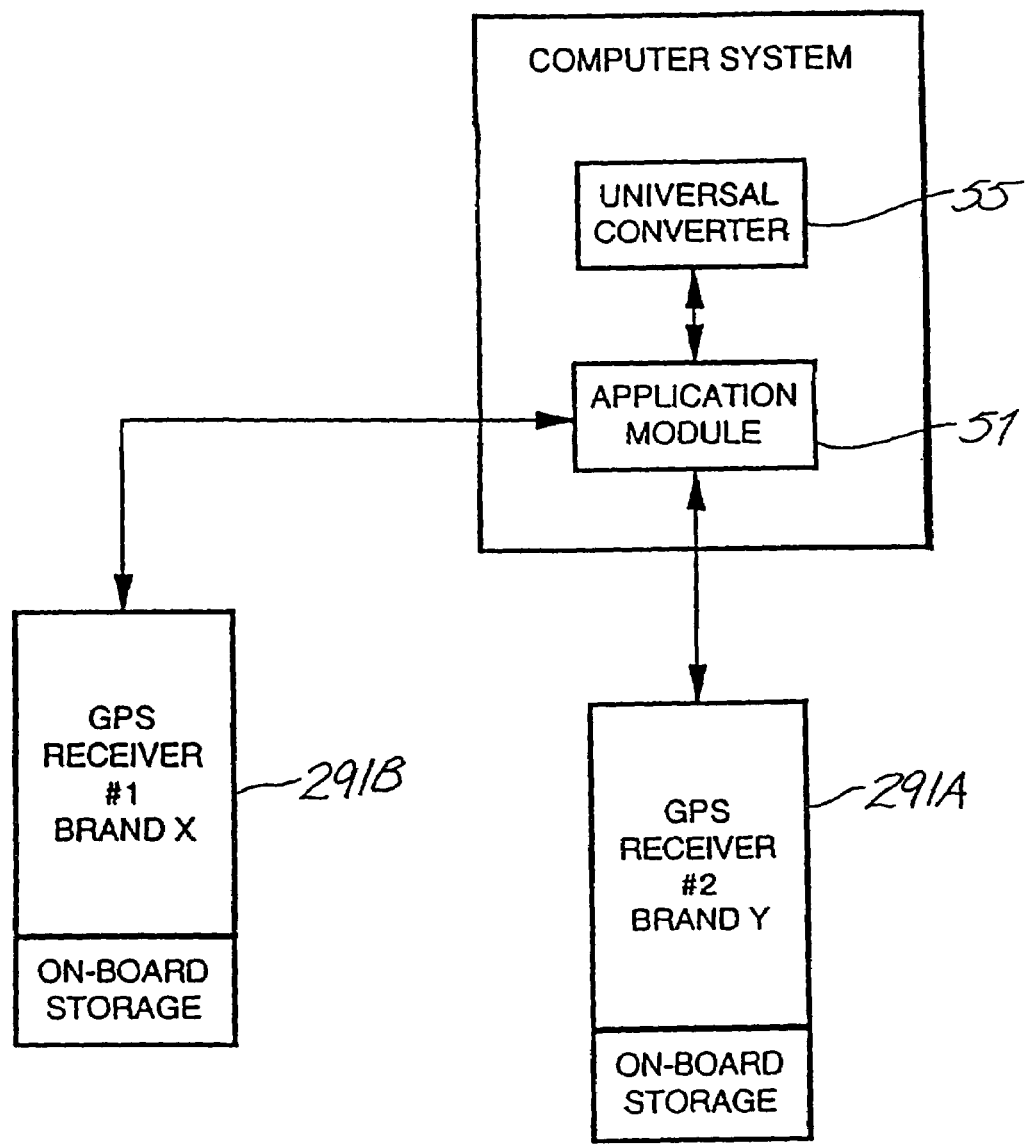
FIG. 29 illustrates a software module configuration of the universal translator.

As illustrated in FIG. 29, the universal converter enables the PCD to read in data provided by third parties 291a, b and convert or filter such data to a format useable by the PCD. The universal converter first inspects the received data to determine if the data is in a known format which can be converted to the format used by the PCD. If the format is not known by the device, the universal converter attempts to extract any ASCII data or format the data as a bit map as appropriate.

Figure 26:
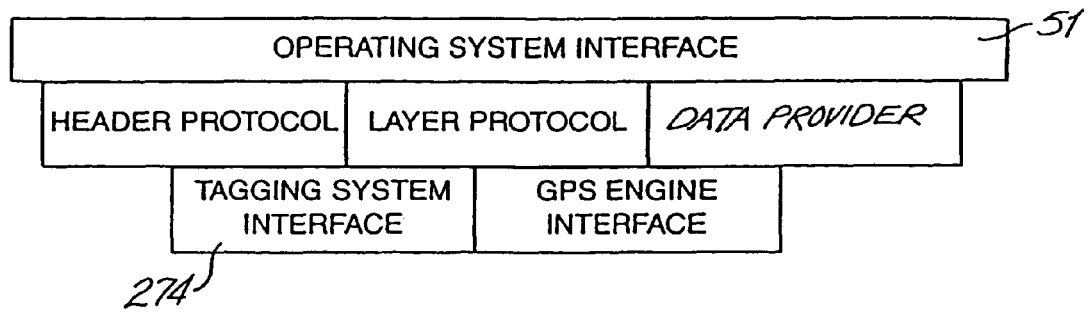
FIG. 26 illustrates a software module configuration of the application module.
Figure 27:
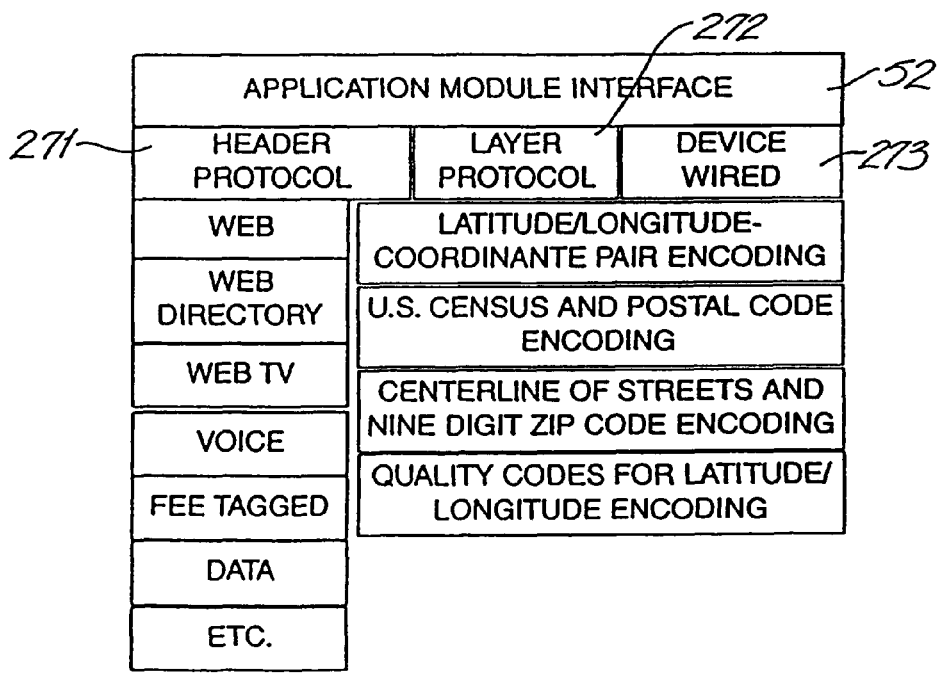
FIG. 27 illustrates a software module configuration of the tagging system.

As illustrated in FIG. 26, the application module further includes programs to implement data formatting and communication protocols using header protocols 271, layer protocols 272, and data provider protocols 273. The application module also includes a tagging system interface program 274. The elements of the tagging system are illustrated in FIG. 27. The purpose of the tagging system is to provide a common universal data structure for requests and responding to requests. Various techniques common in the GEO coding industry, using U.S. Census bureau data and tiger files with certain modifications, can establish parameters for software suppliers to use latitude and longitude encoding as coordinate pairs, postal code encoding and street centering encoding, all for the benefit of accuracy in designating certain files as "tagged". The tagging system provides the ability to apply and strip header and layer information to and from data files.

FIG. 4A shows the top level page menu display hierarchy of the PCD. At initial power on the initialization page 25a (shown in FIG. 2) is displayed. The initialization page allows for the entry of a personal identification number and other data. Depressing the home button 27E (shown in FIG. 2) displays the Main Menu page 25b. A number of additional pages are available from the Main Menu page. These include the GPS 25c, Fax 25d, Beeper 25e, Phone 25f, Computer 25g, Radio 25h, Send Queue 25i, and Receive Queue 25j pages.

Figure 5A:
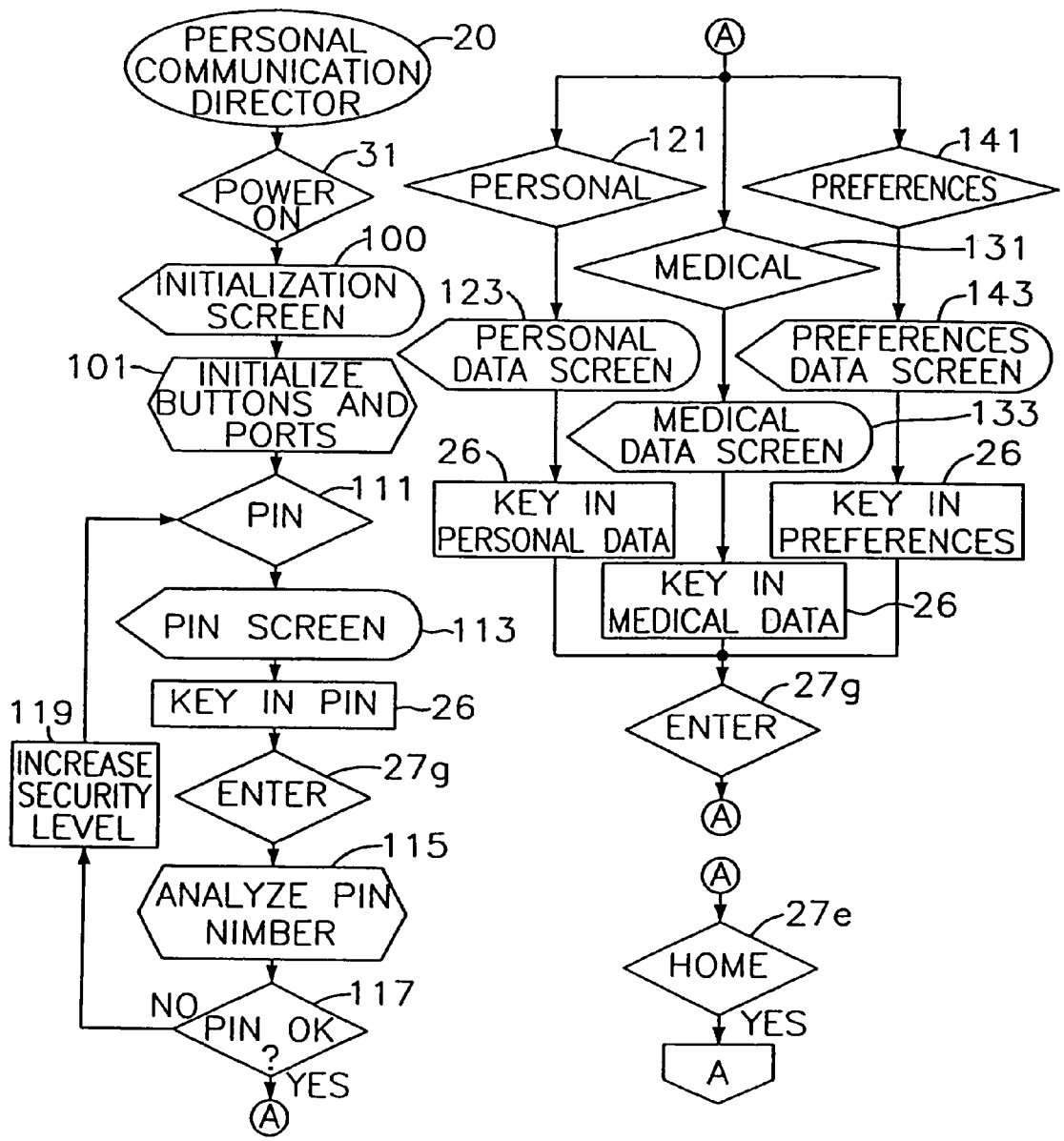
FIG. 5A illustrates a flow chart depicting the program sequence for the entry of a personal identification number (PIN) and personal data into the PCD of FIG. 2

FIG. 5A lists a sequence for the operator of the PCD to answer certain questions, provide information for future access regarding handling of emergency events and handling of same by civil authorities or private individuals empowered to act on behalf of the operator. Access is denied or provided based upon user codes. The entry of a user code may allow for limited to full access of the data stored in the device and usage of same with different codes providing different levels of access and usage. Similar information and sequencing is provided by the application modules and operating system for medical and other information in the event of emergencies. In one embodiment of the preferences screen (not shown) information can be displayed in a specified manner, events recorded and equipment options listed. Specific usage of the device and furnished software would be recalled by each user having access and user codes to operate the PCD, each user having unique individual screens and setups based on that users preferences. The initial setup of screen preferences and other user configuration details are well known in the art.

Selecting PIN 111 from the Main Menu page displays a screen 113 prompting the user to input a personal identification number. Using an alphanumeric key pad 26, the user inputs a personal identification number and presses ENTER 27g. The processor analyzes the entered personal identification number and determines if the number is valid 115 FIG. If the entered personal identification number is valid the processor enables PERSONAL 121, MEDICAL 131, PREFERENCES 141 touch points on the display screen. These touchpoints, and touchpoints later referred to, are selectable either by pressing the display screen at the touchpoint location or by selecting the underlying display item with the cursor. If the PCD already contains personal, medical and preference data, the HOME button 27e is enabled. If the personal identification number is not valid, the processor 21 will increase the device security level 119. This may include, but is not limited to, disabling the PCD operation for a specified time. Selecting PERSONAL 121, MEDICAL 131 or PREFERENCES 141 touchpoints displays the corresponding pages 123, 133, or 143. These pages request specific data, and allow the user to input data using alphanumeric key pad 26. Completion of data entry is indicated by pressing the ENTER button 27g.

In addition, the Initialization page 100 FIG. 2, as well as all other pages, displays the time and the date 103, touch points for QUE IN 550 and OUT 600 (described later in this document) and limited GPS information 107. The limited GPS information comprises of the user's location (latitude and longitude), an an arrow pointing to north and an arrow indicating direction of device travel.

Figure 5B:
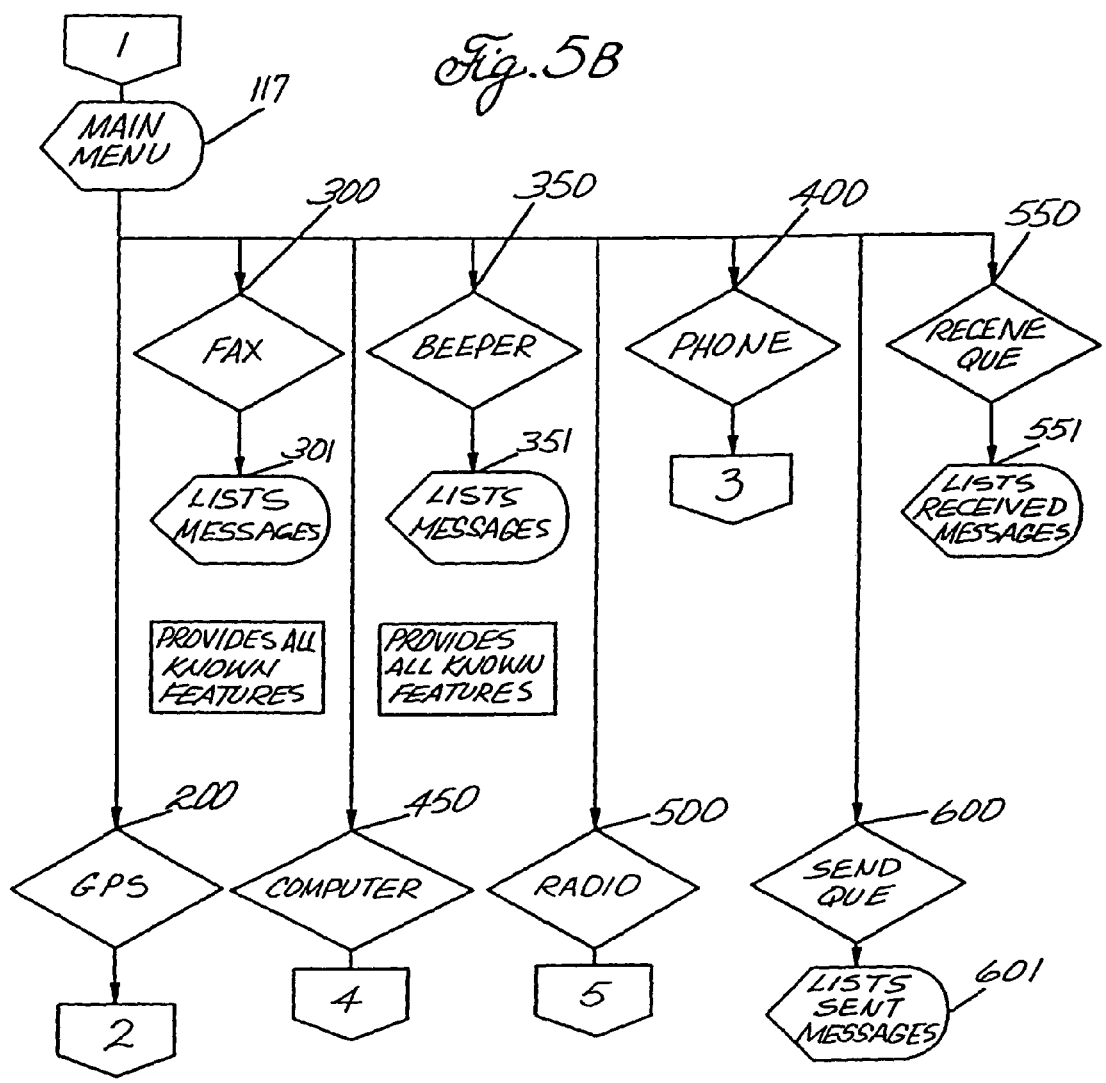
FIG. 5B illustrates a flow chart depicting the program sequence for the user to select a mode of operation using the PCD of FIG. 2.
Figure 6:
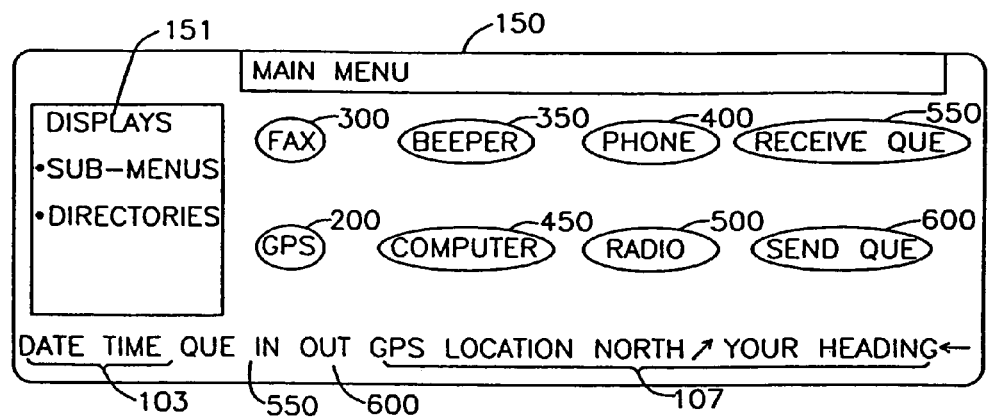
FIG. 6 illustrates the Main Menu page of the PCD of FIG. 2.

When enabled, pressing the HOME button 27e (FIG. 2) signals the processor to display the Main Menu page 150 FIG. 5B. As shown in FIG. 6, the Main Menu page allows the operator to use the touch screen to select the GPS 200, FAX 300, BEEPER 350, PHONE 400, COMPUTER 450, RADIO 500, RECEIVE QUE 550 and SEND QUE 600 touchpoints. The heading and directional information are displayed in real time and are dynamic. Pressing the FAX touchpoint causes the processor to display a Fax page (shown in FIG. 12) which lists received facsimile messages 301. The Fax page includes display interfaces appropriate for the sending and receiving of facsimile communications through the FAX Phone Modem port 29g, and such displays and functions are well known in the art. Pressing the BEEPER touchpoint causes the processor to display a Beeper page (shown in FIG. 13). The Beeper page displays received beeper messages 351 and allows for the deletion of such messages from the display and internal memory storage. Also, a sub-menu portion of the display 151 is reserved for sub-menus and directories.

Figure 7:
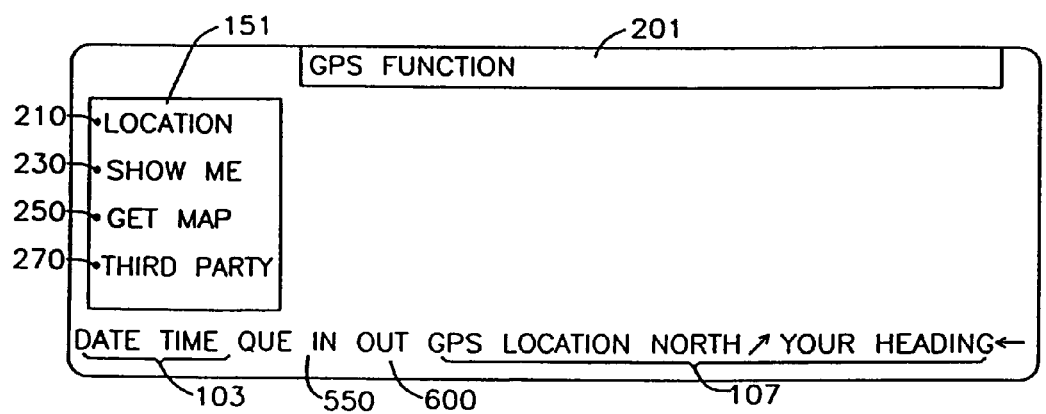
FIG. 7 illustrates the select GPS Function page of the PCD of FIG. 2.

Pressing GPS 200 causes the processor 21 to display a GPS Function page 201, which is illustrated in FIG. 7. The GPS page provides for selection of a GPS mode through touch points in the sub-menu portion of the display. The available modes are location 210, show me 230, get map 250 and third party 270 modes. The display returns to the GPS Function page when the PREVIOUS button 27i (shown in FIG. 2) is pressed. The display hierarchy for the GPS functions is illustrated in FIG. 5C. The Location, Show Me, Get Map, and Third Party pages descend from the GPS Menu page. The Location page comprises the current map, the location on the map of the device, and a plot of the trail of the device on the map. The sub-menu portion of the display provides for additional selection of still further pages. These pages include a Menu page, a Mode page, a Waypoint page, and a Preferences page.

Figure 8:
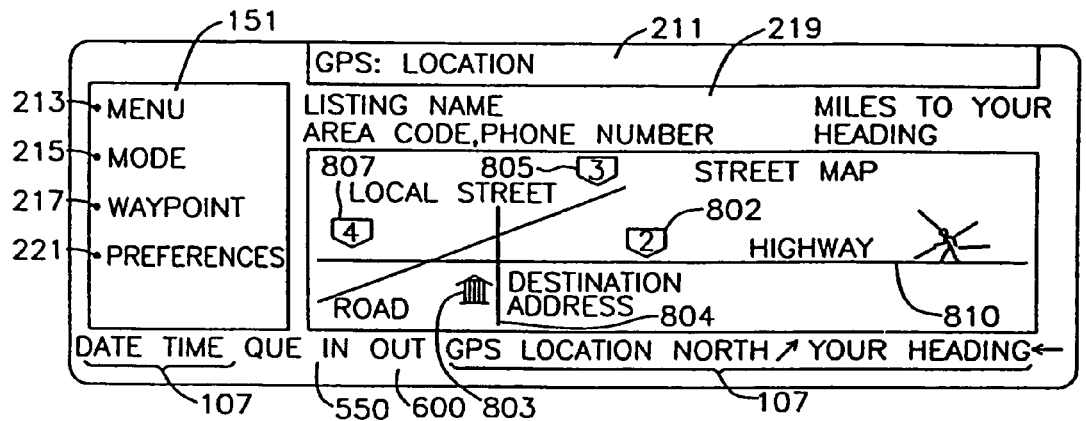
FIG. 8 illustrates the GPS: location page of the PCD of FIG. 2.

The Location page is illustrated in FIG. 8. The Location page includes a GPS map 219 (latitude and longitude encoded coordinate pairs). The sample page shown is an encoded map showing the device position, plot trail and the encoded map location of the selected waypoint. The map displayed could be from on-board memory or sent by other third parties by way of communication links to the PCD. When map data files are encoded with location information, the location information can be referred to as waypoints. These tagged waypoints, with links to other data structures, can then be sent to users via an application to various communication systems. Closed-loop or proprietary GPS receivers can send/receive data to/from other third parties (Brand X, Brand Y) via their own proprietary format using an application system as a universal converter. The location information is dynamic and updated periodically by the PCD's communication system via link-up with GPS-based satellites. The Location page indicates the PCD position 801, indicated by a walking person, as being located on a highway 810. A waypoint 802 is along the highway en route to the desired destination address 803 located on a local street 804 which intersects the highway. A first point of interest 807 is also displayed as being along the highway, as is a second point of interest 805 along a second local road intersecting the highway. The limited GPS information, providing location, heading and north, is also displayed. The illustrated Location page display shows only one possible combination of a map layout Other display sequences such as North up, course up, user at top of screen, user in middle, and other display sequences are possible. The dynamic nature of the PCD allows the PCD to display GPS encoded maps as the PCD progresses dynamically with relation to the maps.

Using interpolation techniques, performing spatial query analysis, and establishing layers for best display scale for any given map record allows the device to provide the user extended capability not possessed by traditional GPS devices. Applying various protocols and interpolation techniques allow files to be arranged geographically by distance from a designated point (usually the requesters latitude and longitude as the starting point, but other locations may also be used). The maps are also arranged in layers, menus, limited, listed, showed, displayed, and sorted.

The Location mode provides typical GPS system functions. The touch points MENU 213, MODE 215 and WAYPOINT 217 and PREFERENCES 221 provide access to the Menu, Mode, Waypoint, and Preferences pages. These pages, along with various buttons on the alphanumeric key pad 26 FIGS. 2 and 4 and special function buttons 27, are used to configure the display to the user's preference. The preferences page 221 enables selection of such features as voice, maps, scroll, off screen maps away from cursor and other features. The listing name 219 portion of the Location page displays information pertaining to a waypoint selected through the use of the cursor.

Figure 9:
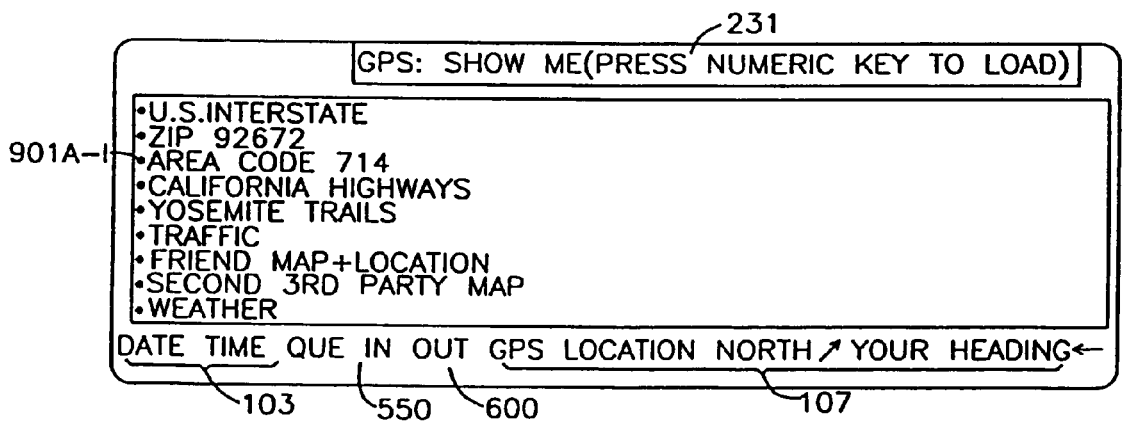
FIG. 9 illustrates the GPS: Show Me page of the PCD of FIG. 2.

FIG. 9 illustrates the Show Me page accessed from the GPS page. The Show Me page shows a list of available maps 901*a-i* stored on-board, which includes maps retrieved from the receive queue area of the PCD memory. The user can load a map into the location or third party pages by pressing the corresponding number key on alphanumeric key pad 26 (shown in FIG. 2) or by scrolling through the list to highlight the appropriate map and then pressing ENTER button 27*g*. Maps may also be removed from on-board storage, using the DEE button 27*h*.

Figure 10:
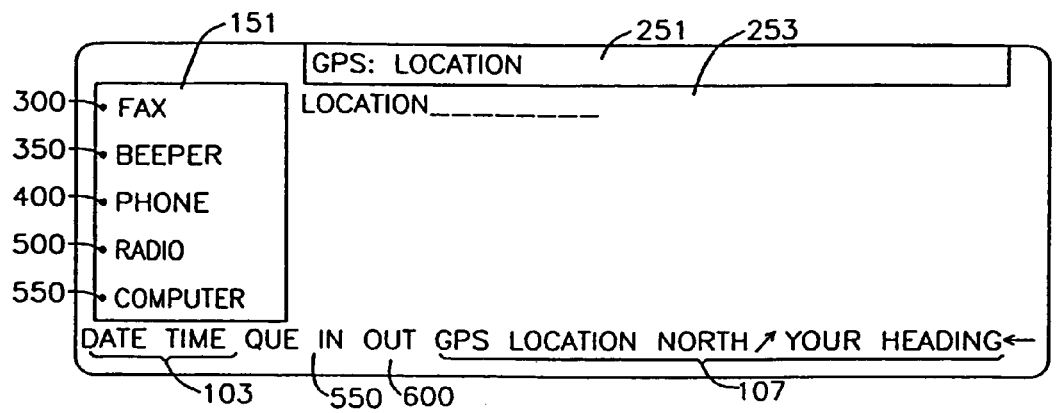
FIG. 10 illustrates the GPS: Get Map page of the PCD of FIG. 2.

FIG. 10 illustrates the Get Map page accessed from the GPS Menu page. The user of the PCD can request the map by location from PCD memory or an external source. The user may enter a desired map location. If a map location is entered, the PCD will only search PCD memory for a map for the entered location. Maps from an external source are downloaded via any of the communication links such as the FAX, BEEPER, PHONE or RADIO touchpoints provided in the sub-menu portion of the display 151. Depending on the user's requirements, several maps could exist showing similar map areas with different layers for viewing. By way of example, airport maps with air space requirements, coastal waterway, maps, and interstate maps, and even hand drawn maps scanned into a computer system all show different resources within a given geographic area. These maps, when presented on the PCD, could over-saturate the display map detail for any given map area. Therefore, it is preferred that the actual map displayed be selectable. Maps are retrieved by pressing QUE IN 550, scrolling to highlight the desired map, and pressing ENTER 27*g* FIG. 2.

Figure 11:
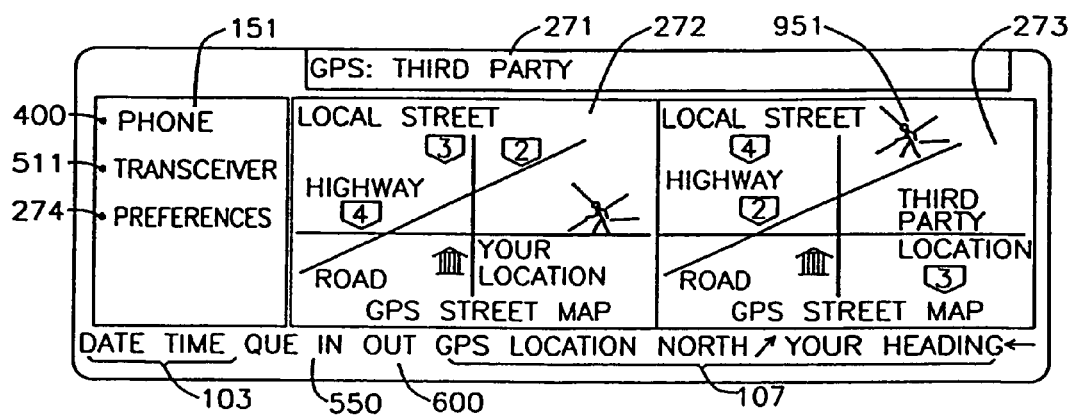
FIG. 11 illustrates the GPS: Third Party page of the PCD of FIG. 2.

FIG. 11 illustrates the Third Party page accessed from the GPS menu page. The Third Party page provides an interface to communications with a third party through touch points in the sub-menu display 151. In the display shown, a user can receive a third party's data and GPS encoded map for viewing on the device or save it for future usage. The user can also dynamically track the third party by periodically having the third party send updates via normal communication links. The third party location can be displayed on maps dynamically sent by map publishers, maps already on-board (furnished at some earlier date), or on maps sent by the third party. The PCD plots and interpolates the GPS data sent by the third party and places an icon 951 (GPS latitude and latitude coordinate pair) on the displayed map using spatial query analysis techniques performed by an application module. The information received from the third party may be other than maps or GPS encoded information, but may be information of any type. The data is received from the third party using phone 400 and radio communication links 500. A PREFERENCES touch point 274 enables entry of items such as phone numbers for automatic call back and time interval for automatic transmission of information. If the radio, a satellite phone, or other frequency based communications link is utilized, the PREFERENCES touch point allows entry of frequencies for use for automatic transmission of information. A split screen displays the user's location on a map on the left side of display 272 and, after contact with a third party via a communication link, the third party's map and location on the right side of display 273. If the third party's location is sufficiently close to the user's location, or if the user's displayed map covers a sufficiently large area, both the user's and third party's location can be shown on the same map without resort to a split screen display.

Figure 32:
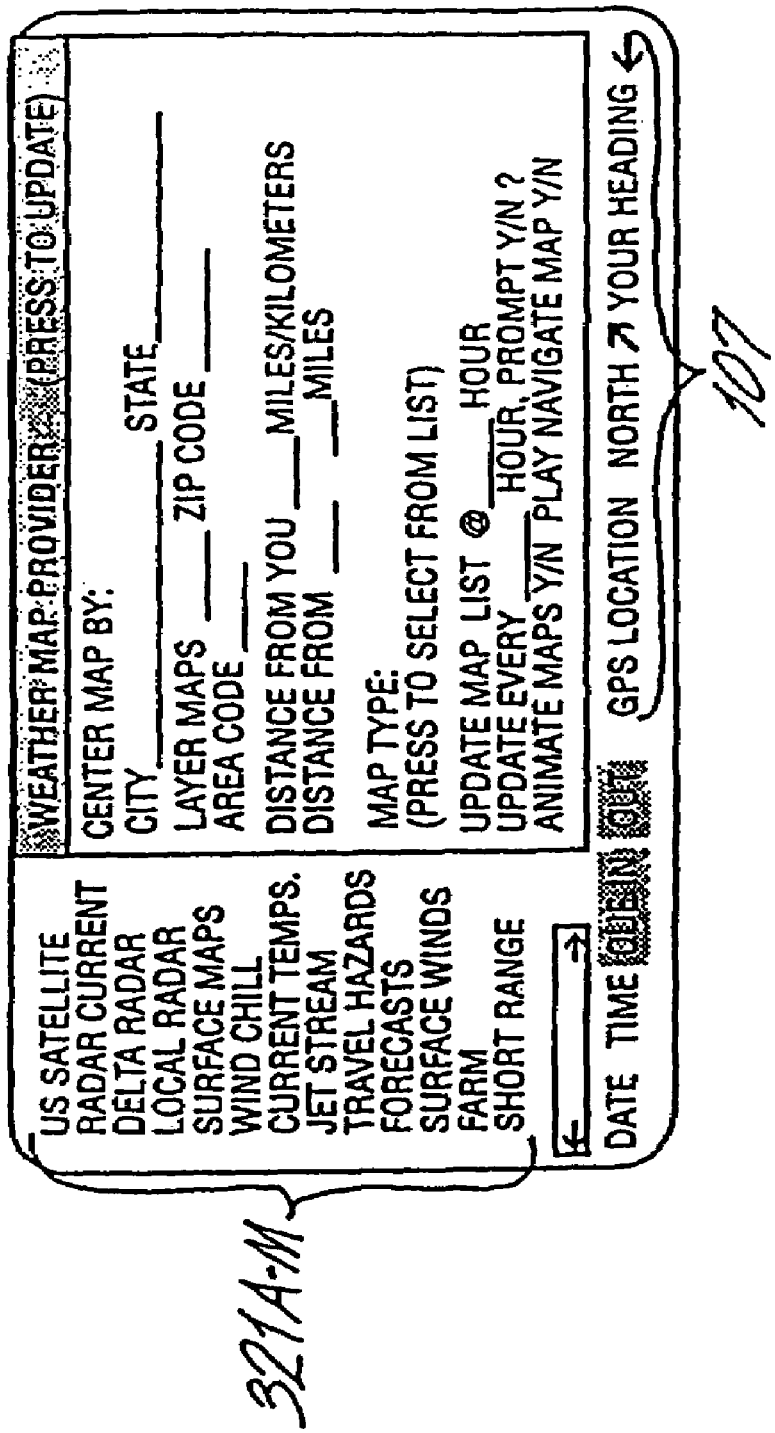
FIG. 32 illustrates the Weather Map Request page of the PCD of FIG. 2.

FIG. 32 illustrates a Weather Map Request page. The Weather Map Request page is accessed by pressing the Weather button 27*n* (shown in FIG. 2) on the PCD. The Weather Map Request page allows the PCD user to specify the map location and scale, the map type, whether the selected map should be automatically updated at specified intervals, and whether a set of maps should be displayed in a sequential fashion. The PCD displays a number of different types of weather maps, including satellite images, radar maps, temperature maps, wind chill maps, and any other type of weather map available. Some weather information is more perfectly provided by showing a sequence of displays indicating the change in weather over time. Therefore, the PCD allows the operator to sequentially display a set of maps, thus providing an animated map display.

Figure 33:
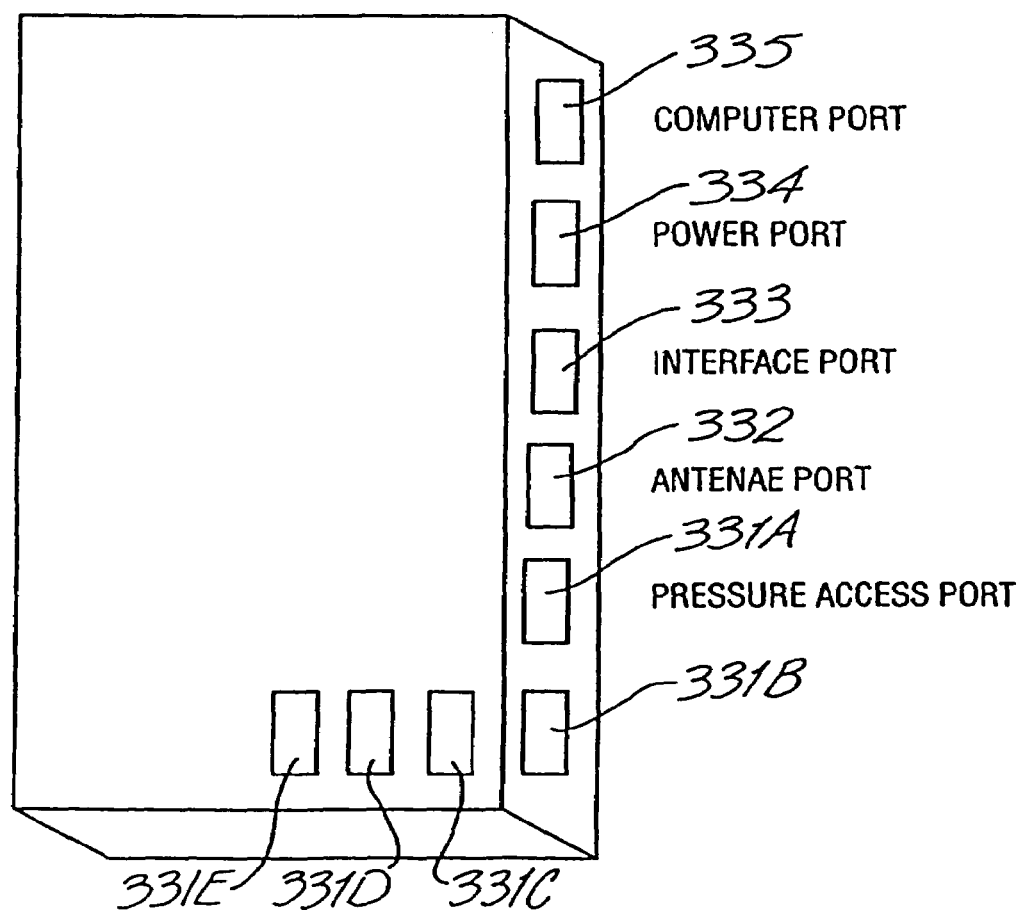
FIG. 33 illustrates a weather reporting device.

FIG. 33 illustrates a weather reporting device. The weather reporting device has a power port 334 to provide electrical power to the weather reporting device. As with the PCD, the weather reporting device may also be powered by a battery (not shown). The weather reporting device also has a computer port 335, an interface port 333, an antenna port 332, a pressure access port 331*a*, and a number of auxiliary ports 331*b-e*. The computer port provides a communications interface to a standard personal computer or the PCD. The interface port provides an interface to systems with weather detection features, such as aircraft with weather radars or lightning strike finders. The antenna port allows an external antenna to be connected to the weather reporting device, thereby providing remote operation capability. The pressure access port provides external access for an internal pressure sensitive device (not shown) for the determination of barometric pressure. A plurality of auxiliary input ports 441*b-e* provide an interface for connecting the weather reporting device to external weather detection sensors such as temperature sensors, wind sensors, and other weather sensing devices.

Figure 12:
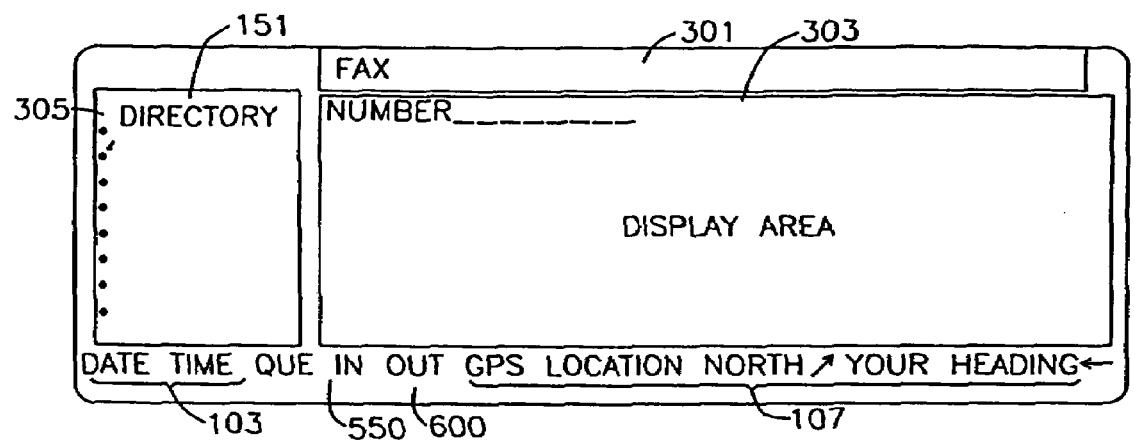
FIG. 12 illustrates the FAX page of the PCD of FIG. 2.
Figure 13:
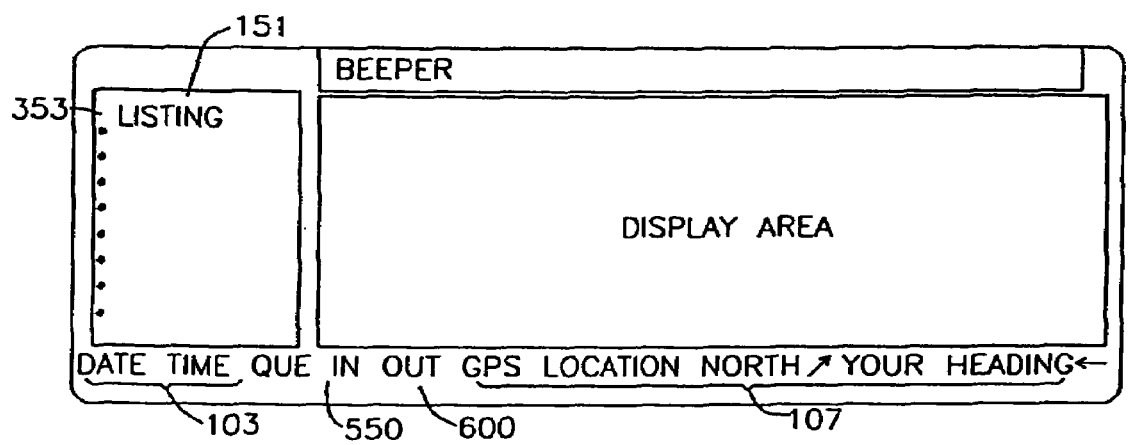
FIG. 13 illustrates the Beeper page of the PCD of FIG. 2.

The Fax page is accessed by pressing the FAX touchpoint on the Main Menu page. FIG. 12 illustrates the Fax page. The sub-menu portion of the display is available for listing previously stored phone numbers. These phone numbers are selectable as a facsimile destination. In addition, the user can directly enter the phone number to indicate the facsimile destination. As with other pages, the PCD continues to dynamically display the limited GPS information of location, north and heading. The PCD facsimile function is performed by application software executed by the processor. Multiple fax locations, time set, send after certain time, and other traditional functions of fax machines and their implementation are well known in the art. The Fax page provides for display of a message (not shown) entered via the alphanumeric key pad 26 (shown in FIG. 2) or through selection of messages stored in the send queue area of device memory. Messages stored in the queue area of PCD memory can be selected by scrolling through a directory 305 of all fax messages stored To view a stored message the user uses the SCROLL button 27*a* (shown in FIG. 2) to highlight an entry, and then press ENTER button 27*g*. Pressing the SEND button 27*b* transmits the selected or entered facsimile. The user may also view received faxes using this mode by pressing QUE IN 550 FIG. 12, using the SCROLL button 27a to highlight the desired message, and pressing the ENTER button 27g.

The Beeper page is accessed from the Main Menu page. Pressing the BEEPER touch point on the Main Menu page causes the processor to display the Beeper page. The device contains capabilities consistent with common practices of beepers, also known as pagers, such as sending and receiving messages. These functions and their implementation are well known in the art The PCD is also satellite communications capable. Beeper messages can be received by the PCD without interference to the other device capabilities. Therefore, the user could continue using the telephone or other features seemingly uninterrupted by the reception of digital beeper messages and display of those messages. The Beeper page provides a list of beeper messages (not shown) stored in the receive queue area. Messages stored in the receive queue can be selected by scrolling through listing 353 FIG. 13 of all beeper messages stored. To view a stored message, the user uses the SCROLL button to highlight a desired message and presses the ENTER button 27g. Messages are deleted when the DELETE button is pressed with at least one message selected.

Figure 14:
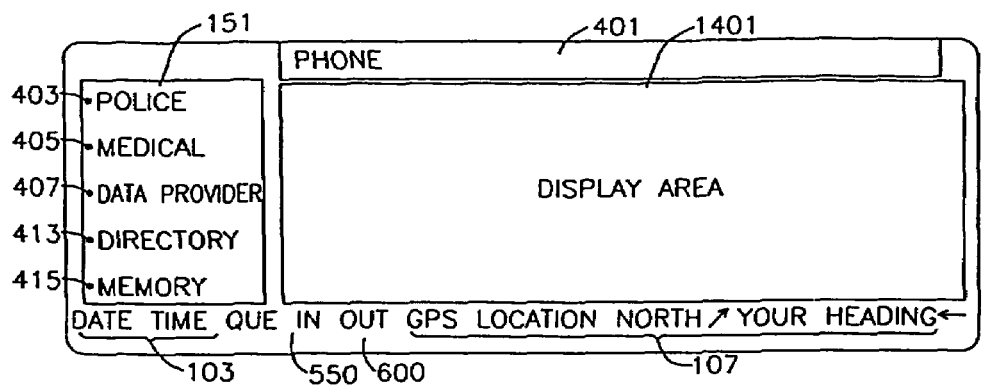
FIG. 14 illustrates the Phone page of the PCD of FIG. 2.
Figure 15:
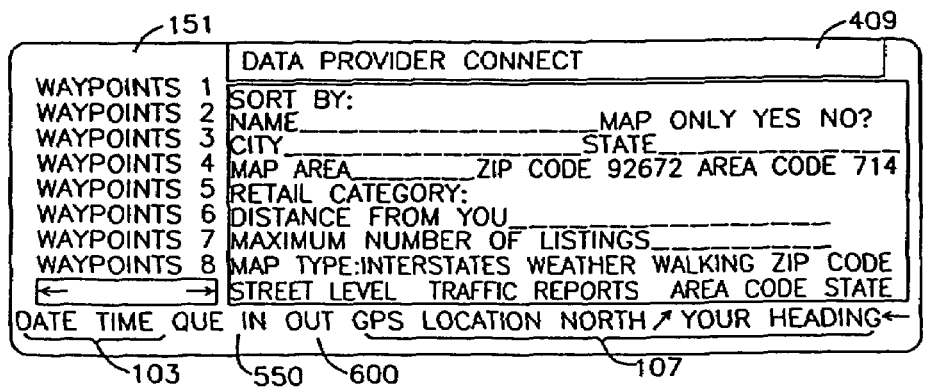
FIG. 15 illustrates an Information Request page of the PCD of FIG. 2.

The Phone page is illustrated in FIG. 14. The Phone page is accessed from the Main Menu page. Pressing the PHONE touchpoint on the Main Menu page causes the processor to display the Phone page. The Phone page is also accessed by pressing the PHONE touchpoint on the Get Map and Third Party pages. As with the other pages, the limited GPS data is continuously displayed showing PCD) location, heading, and north. The PCD can access several areas of the display even while the PCD is being used as a telephone. Information provided in the display area 1401 will vary depending upon the page from which the phone page was accessed. The Phone page provides for selection of a function through touch points displayed in the sub-menu portion of the display. The selectable touchpoints are: POLICE 403, MEDICAL 405, DATA PROVIDER 407, DIRECTORY 413, and MEMORY 415.

When the POLICE touchpoint is pressed, the PCD places a call to emergency 911. The 911 telephone number is the default, another number could instead have been entered for any particular user through the preferences selection. Once the telephone call is answered, the PCD provides the information entered using the Preferences function and the device location. The user may also establish voice and data communications through the microphone 34 and speaker 33 (shown in FIG. 3).

The PCD performs equivalent functions when the MEDICAL touchpoint is pressed. As different phone numbers and information can be entered in the selection of user preferences, however, different phone numbers may be used and different information may be transmitted.

When the DATA PROVIDER touchpoint is pressed, the processor displays the Data Provider Connect page. The Data Provider Connect page provides a means to specify the type and amount of data to be downloaded from a specified data provider. The Data Provider Connect page has numerous data fields which are selected by use of the cursor. Once a field is selected, the user may enter data in that field using the alphanumeric keys. The data fields include data for name, city, state, map area, zip code, telephone area code, retail category, distance from device location, and maximum number of listings to be provided by the data supplier. Whether a map only is requested and what particular types of maps, such as interstate maps, walking area maps, zip code maps, street maps, area code maps, or state maps, are requested are also provided as options. Touch points for weather information and traffic reports are also provided. Once the appropriate data fields and/or type of data required is input or selected, pressing the send key transmits the data request to the data provider. Details regarding the method of transmission of the responsive data is automatically sent by the data provider to the data provider along with the data request.

The primary data providers may include the public telephone company networks but may also include other entities. The data providers maintain data, including maps, telephone yellow page entries, and other information such as traffic and weather reports. This information is maintained in a timely manner and is accessible through the use of data base methods well known in those in the art. Upon receiving a request for data, the data provider determines the nature of the data request, searches the appropriate data base or data bases, and transmits the requested information to the requesting device in the manner specified by the requesting device. The user, after the PCD receives the data as requested, disconnects, goes off line to review the information, deleting some, saving others, and storing other encoded information on the PCD. The user can now further edit the device's entire data base and decide a sequence for navigating to the locations listed in the various menus as waypoints. Thus users of the PCD can decide to navigate using the GPS features of the PCD and select certain waypoints and the order in which to proceed. By way of example, but not limited to same, users could select gas stations, banks, restaurants, shopping centers in unfamiliar areas, navigate today from one point of beginning and tomorrow continue navigating from another point of beginning, being assured that the device will always know how to get to various locations. Should the user require further locations to visit, the PCD is capable of obtaining new navigational data and adding to the already active route plan without having to completely start over.

Pressing the DIRECTORY touchpoint 413 displays an alphabetical listing (not shown) of phone numbers stored on-board. The user may scroll through the listing and select a desired phone number. Pressing MEMORY 415, displays an alphabetical listing (not shown) of frequently used phone numbers. The user may scroll through the listing and select a desired number. Pressing the SEND button causes the device to dial the selected phone number.

Figure 16:
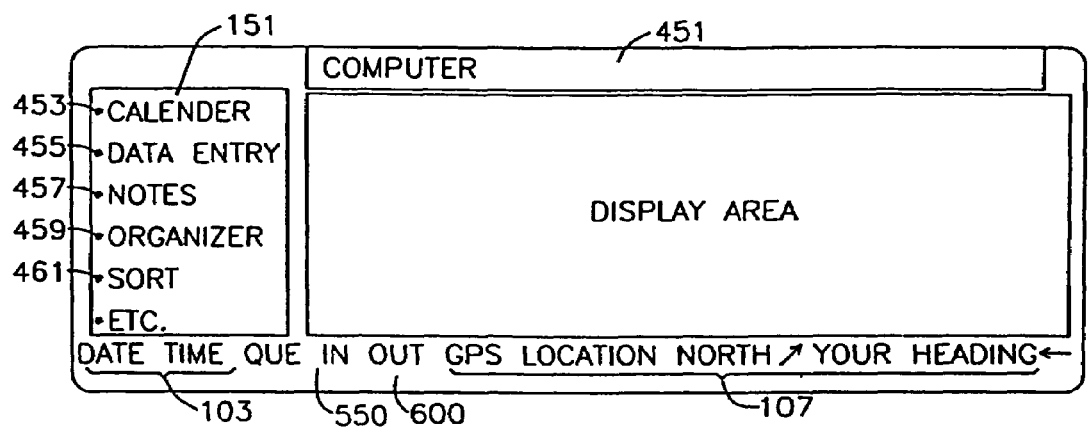
FIG. 16 illustrates the Computer page of the PCD of FIG. 2.

FIG. 16 illustrates the Computer page. The Computer page is accessed by pressing the COMPUTER touchpoint 450 (shown in FIG. 6) on the Main Menu page. The Computer page allows the user to operate the device as a standard personal computer utilizing application programs of the type normally present on personal computers. As examples, the display of FIG. 16 provides for touchpoints in the sub-menu portion of the display for calendar date entry, notes, and organizer application programs. As with the other pages, the limited GPS information is also displayed.

Figure 17:
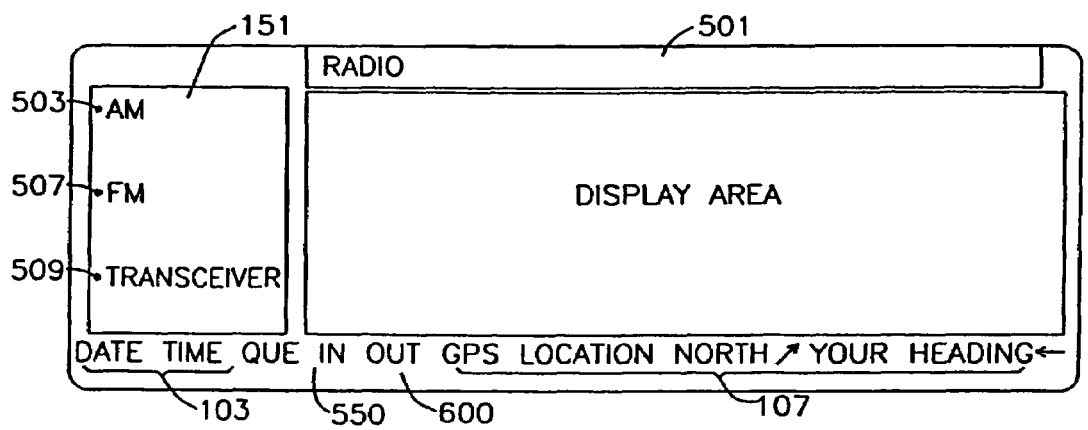
FIG. 17 illustrates the Radio page of the PCD of FIG. 2.
Figure 18:
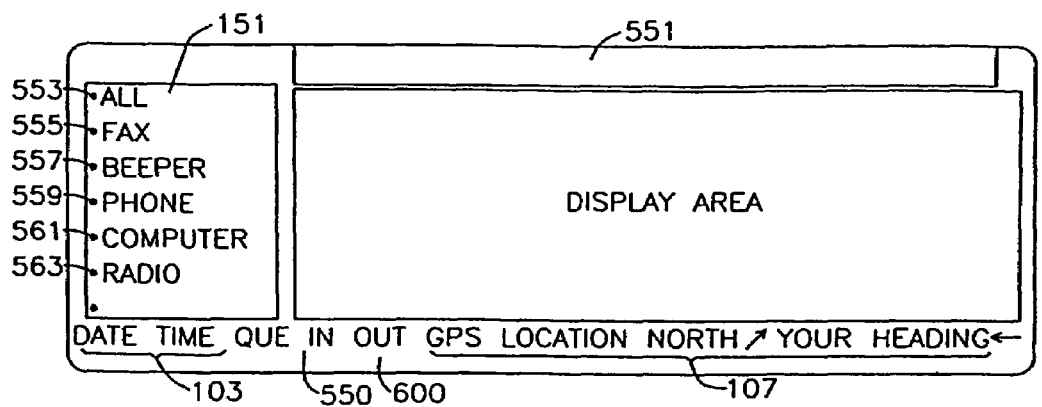
FIG. 18 illustrates the Receive Queue page of the PCD of FIG. 2.
Figure 19:
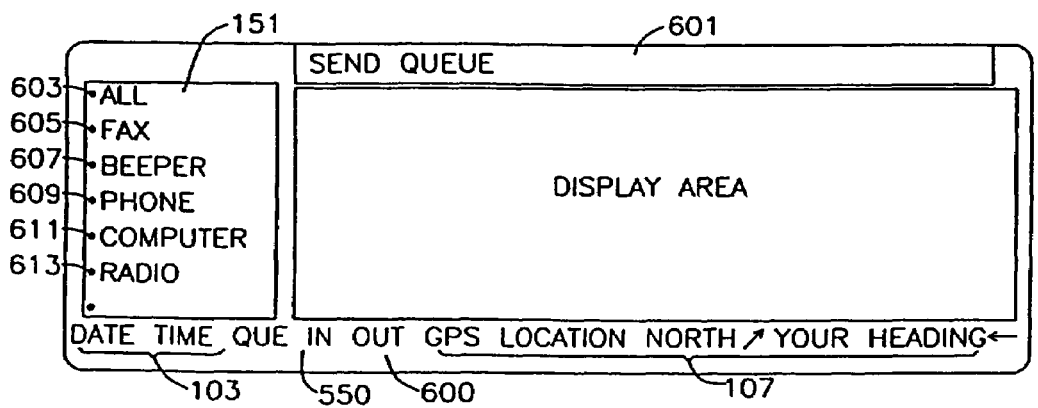
FIG. 19 illustrates the Send Queue page of the PCD of FIG. 2.

FIG. 17 illustrates the Radio page. The Radio page is accessed by pressing the RADIO touchpoint 500 on the Main Menu page. The radio mode provides the user with an interface for selecting the type of radio signal through touch points displayed in the sub-menu 151 area. The selectable types are: AM 503, FM 507 and TRANSCEIVER 511. Selecting any type will display a page (not shown) requesting frequency, volume, and other parameters relating to radio transmission and reception. The AM and FM are standard receivers. The device can thereby tune and listen to broadcasts that provide data links and receive data files using legal AM or FM radio bands (or any other radio band legal to access and provide radio station information). The device therefore allows users to communicate information amongst themselves without having to rely on telephone technology. This is especially valuable when telephone technology is not available.

The Receive Queue page displays stored received messages. The received messages may be displayed by reception type through selection of the transmission line type listed in the sub-menu portion of the display, the selectable types, through touch points displayed in the sub-menu 151 area, are: ALL 553, FAX 555, BEEPER 557, PHONE 559, COMPUTER 561 and RADIO 563. Selecting a type, will sort (by specified type) and display (by date and time) all messages received. By way of example, the radio queue contains GPS-encoded voice mail or digital files (containing information to various sites) provided by private third-party sources. The phone system queue contains previous calls with digital messages linked to web pages containing voice and video data. The computer which may be queued contains personal letters, calendars, notes and the like from more traditional sources or user created tagged files for storage. The fax queue contains traditional faxes which may illustrate maps with waypoints. The beeper mode queue contains received beeper messages (digital and voice).

The Send Queue page is accessed by pressing the SEND QUE touchpoint on the Main Menu page. The Send Queue page includes similar functions as the receive queue, except the Send Queue is a staging area for sending messages. The Send Queue page displays sent or to-be-sent data and an interface for selecting the specific type of queue. The selectable types, through touch points displayed in the sub-menu portion of the display 151, are: ALL 603, FAX 605, BEEPER 607, PHONE 609, COMPUTER 611 and RADIO 613. Selecting a type, will sort (by specified type) and display (by date and time) all messages sent or waiting to be sent.

Figure 23A:
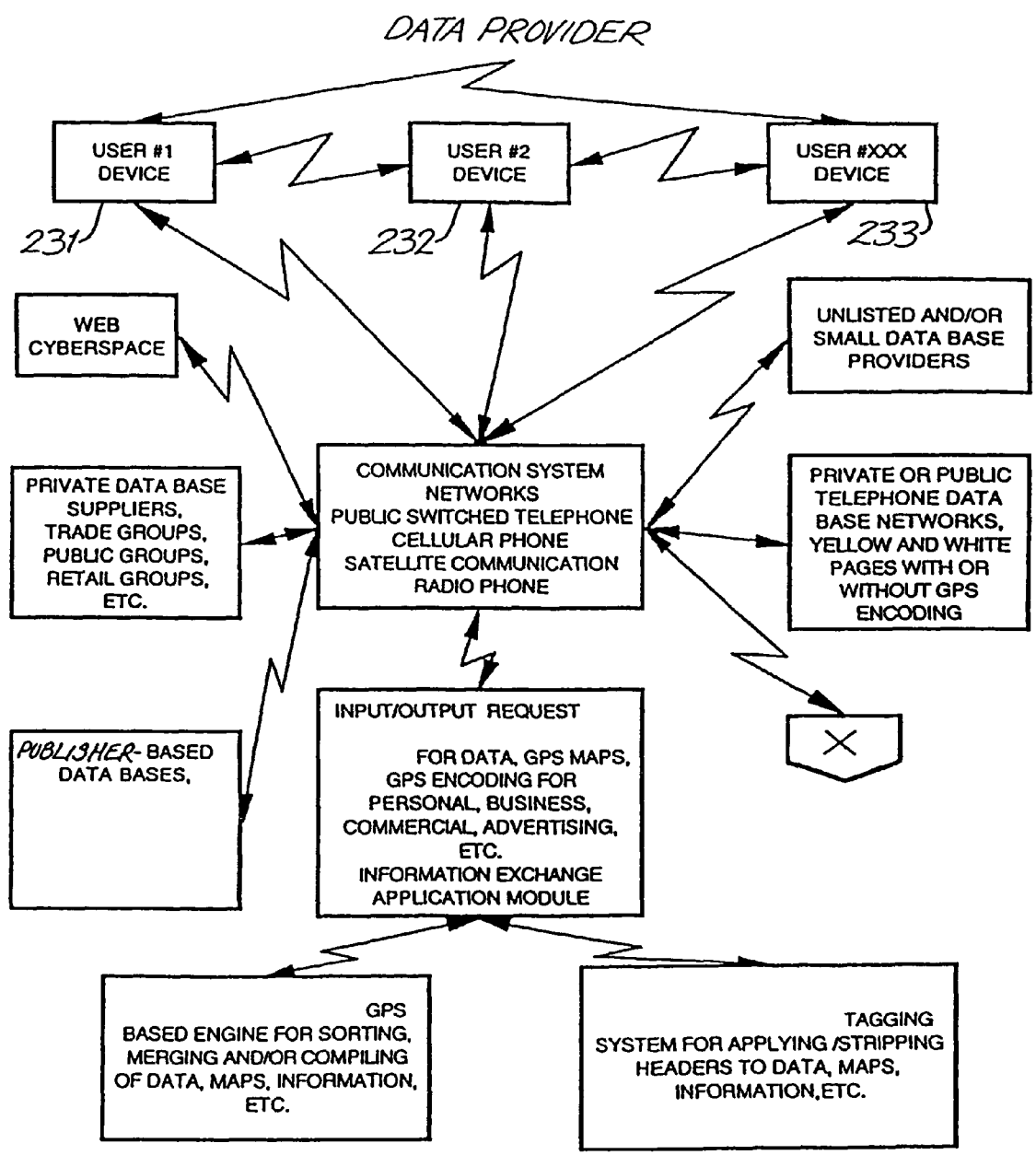
FIG. 23A illustrates an exemplary data provider.

FIGS. 23 A and B are a system block diagram including a block diagram of a data provider. A plurality of PCDs 231, 232, 233 communicate with each other using the aforementioned communication means. The PCDs also communicate with various data base information suppliers including private data base information suppliers, publisher data base information suppliers, telephone service data base information suppliers, and a data base provider. The data base provider receives digital requests for map information or other data regarding a geographic area. The data provider collects map data and other data and tags the other data to the map data and maintains the map and location tagged data in a data base. Human intervention is not required in responding to data requests.

Figure 23B:
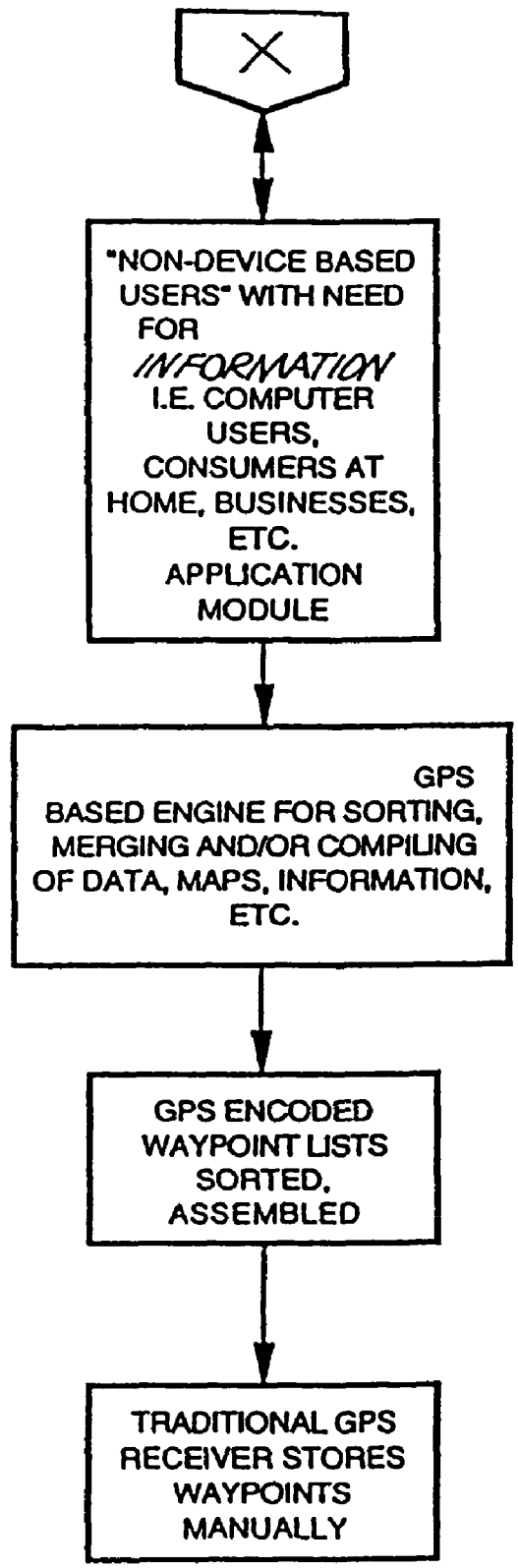
FIG. 23B illustrates an exemplary configuration of a non-PCD computer utilizing a modified application module.

As shown in FIG. 23B, the application module of the device is ported to a computer system not GPS capable, or merely not portable so as to have no need for a GPS receiver. The application module allows non-PCD based computer users to provide data to the data provider in the correct format, as well as receive data from devices or the data provider. This allows the non-device base computer user to track the location of devices and to collect information to be manually entered into a traditional GPS capable device as an aid in future trip planning.

Figure 21:
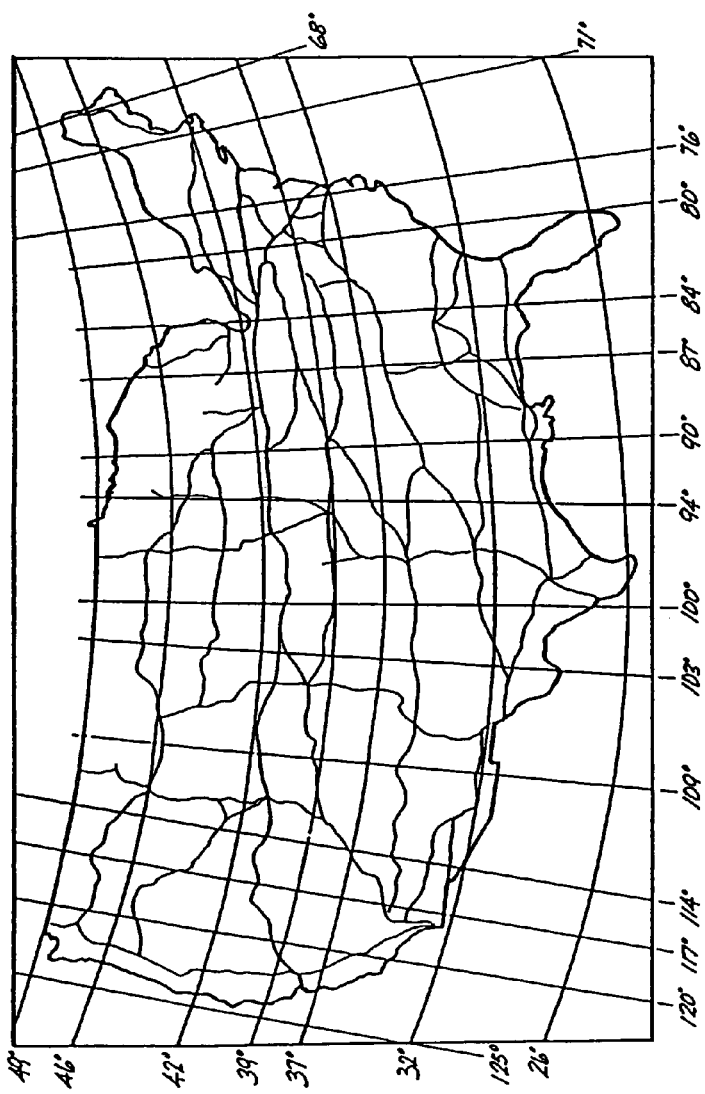
FIG. 21 illustrates a typical GPS encoded map downloaded from a data provider.

FIG. 20 illustrates a list of GPS encoded data for a restaurant listing of restaurants in a requested area. This list may have been furnished by third parties or a data provider. The PCD has stored this information in digital format and is displayed on a GEO coded map, GIFF map or any other map the PCD stored in memory or receives from a third party or data provider. The information can be arranged by the PCD using criteria enabling the user unlimited access to the data. If the user chooses to navigate to these locations singularly or as a group, the GPS engine performs these functions, allowing a user of the device to accurately travel to the desired restaurant. As shown in FIG. 21, the PCD can use any scale of map or combinations and other types of maps as shown. The user of the PCD selects certain maps for storage and recalls same when needed for navigation. By way of example, the user's device could have a local Los Angeles street map, an interstate map (as shown in FIG. 21), and a New York city map in device memory. The user could navigate to the airport using the GPS functions and stored Los Angeles map, fly to New Jersey, rent a car and navigate to New York using the interstate map and, finally, find a specific restaurant in New York City by using the third map stored in PCD memory.

Figure 22:
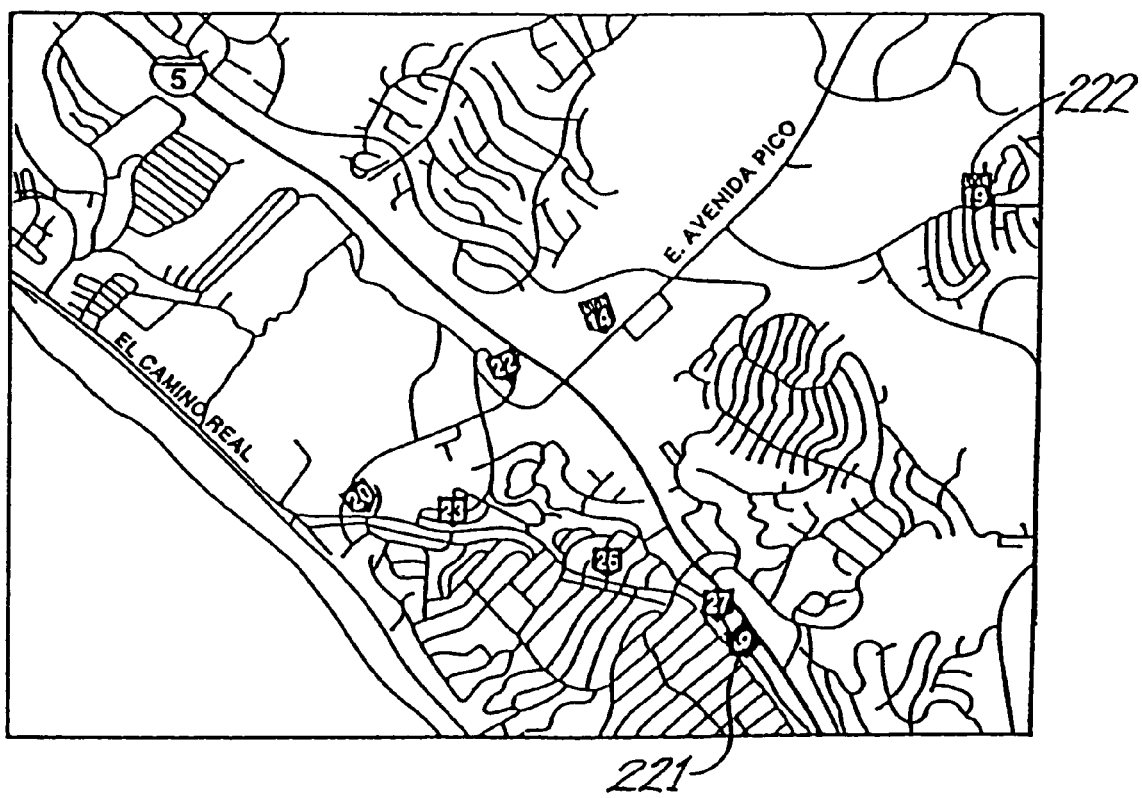
FIG. 22 illustrates a typical GPS encoded map with waypoints locating restaurants within a specified radius.

As shown in FIG. 22, the PCD contains a map with various waypoint locations the user has selected. These waypoints are both standard waypoints 221 and linked waypoints 222. The waypoints are indicated by a marker on the display. Standard waypoints indicate identifiable locations of interest. Linked waypoints have additional data associated with the waypoint. The additional data may be text data, visual data such as a photographic image of the waypoint, or an audio data file. When the marker for the linked waypoint is selected using the touch screen or other input device, the processor determines if the additional data associated with the waypoint is available in the PCD memory. If the additional data is not available in the PCD memory, the PCD automatically requests the additional data from a data provider. Once the additional data is available, the PCD displays or otherwise makes use of the additional data.

Using the map of FIG. 22, the user could navigate to a school, restaurant, bank, gas station, government office using the PCD to interpolate using spatial query techniques to find the best routes to each location. The PCD can re-collate the list for the most efficient route using the application and GPS engine modules. Using software programming techniques and math formulas, persons skilled in the arts will utilize spatial analysis queries and functions to determine best routing and "closest to" scenarios. In addition, centroid interpolation functions and match-rate comparison functions used by the GEO coding community will further enhance this application's ability to universally communicate with other systems.

Figure 30:
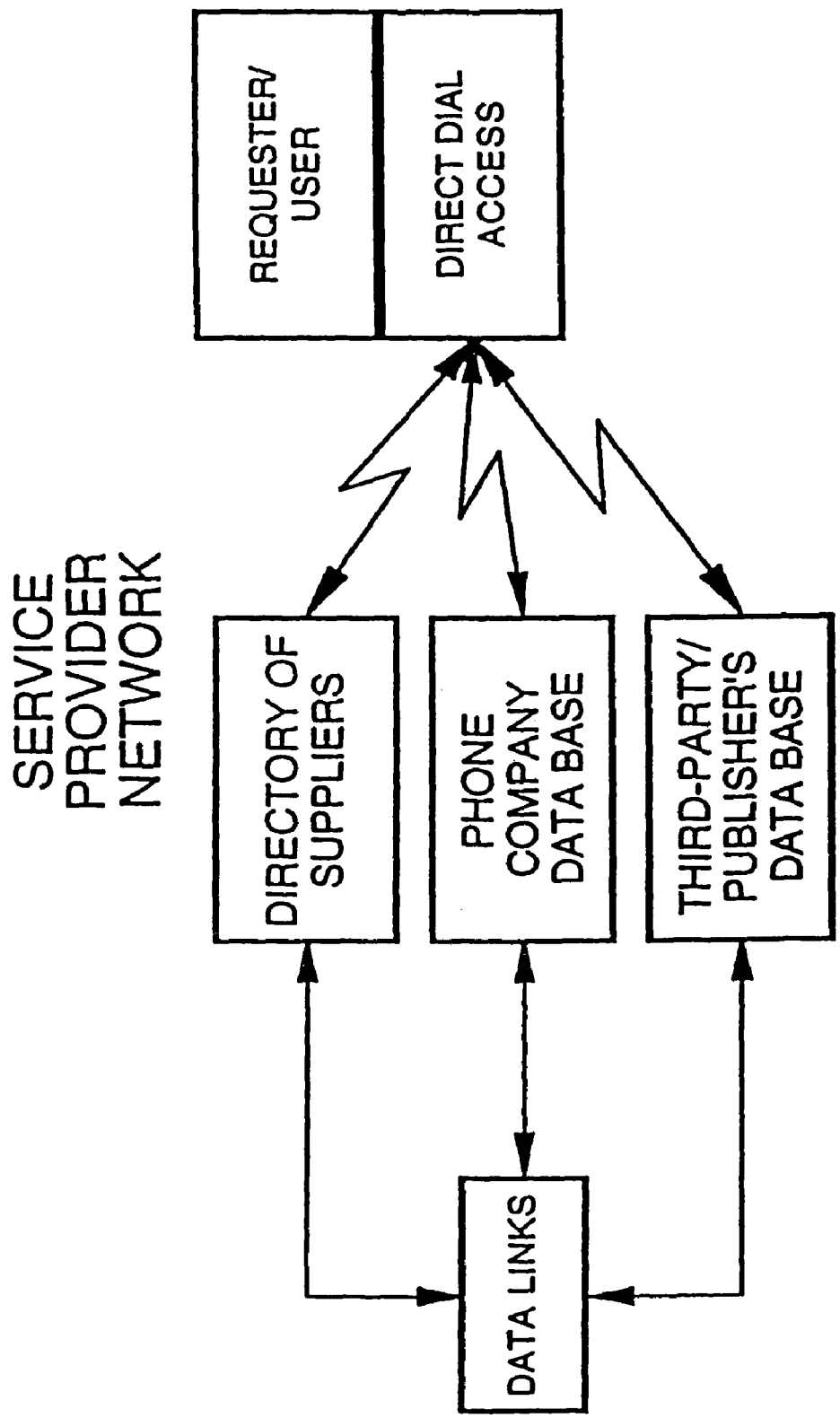
FIG. 30 illustrates a typical configuration of the service provider.

FIG. 30 further illustrates a system whereby the user uses a PCD to dial a direct access number similar to dialing 411, but all requests are requested and serviced automatically. Upon connection to the system, the user makes keyboard requests to the PCD or traditional computer system using the application program of the PCD. Upon requests being received by the data provider or similar information provider, the provider or supplier searches the data base for data responsive to the request. The provider or supplier can access further data through data links to other third party sources and continue to provide all data required by the requester. This system is consistent with the world wide web, linking data through hypertext connections and designations. This inventions system converts information requests to data requests, not verbal requests, as presently being practiced in directory assistance type services. This narrow usage of the application module allows convenient access to directory assistance that primarily provides data and chunks of information in a short period of time consistent with directory assistance today.

Figure 31:
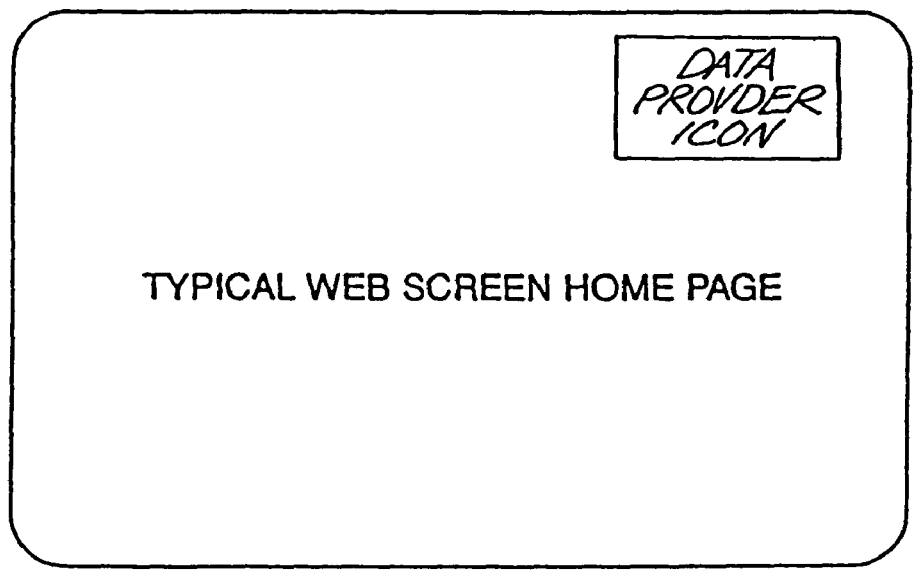
FIG. 31 illustrates a possible configuration of the digital web TV.

FIG. 31 shows a web page screen with a data provider icon displayed on the device. Pressing or otherwise selecting the icon will enable a menu for the requester to specify a data request. Download will be in the form of a compressed digital data file that may include video, sound, or other digitally encoded data.

While this invention has been described with reference to illustrative embodiments, this description is not intended to be construed in any limiting sense. Various other embodiments of the invention will be apparent to persons skilled in the art upon reference to this description. It is therefore contemplated that the appended claims will cover any such modifications of the embodiments as fall within the true scope and spirit of the invention.

The invention claimed is:

1. An information apparatus comprising:
a processing element configured to form a request for data concerning traffic pertaining to an area, and to process responsive data to the request, the responsive data being included in traffic data received from a data provider;
an interface device for requesting and receiving map information from digital map storage separate from the data provider; and
a display for showing thereon map information received from the digital map storage a location of the apparatus, and traffic information resulting from processing the responsive data, the shown map information including a plurality of waypoints indicating corresponding locations of goods or service providers on a map, the waypoints being selectable by a user in an order, wherein the selected waypoints are processed and reordered to uggest to the user a route to the respective locations of goods or service providers corresponding to the reordered waypoints.

2. The apparatus of claim 1 further comprising a receiver for receiving signals from one or more satellites.

3. The apparatus of claim 1 wherein the location of the apparatus is derived from GPS signals received by the apparatus.

4. The apparatus of claim 1 being electrically connectable to a port in a vehicle.

5. The apparatus of claim 1 wherein the digital map storag comprises a computer memory storage device.

6. The apparatus of claim 5 wherein the computer memo storage device comprises a removable data storage device.

7. The apparatus of claim 6 wherein the removable data storage device comprises a memory disk.

* * * * *

UNITED STATES PATENT AND TRADEMARK OFFICE
CERTIFICATE OF CORRECTION

| | | |
|---|---|---|
| PATENT NO. | : 7,702,455 B2 | |
| APPLICATION NO. | : 11/650640 | |
| DATED | : April 20, 2010 | |
| INVENTOR(S) | : Michael L. Obradovich et al. | |

It is certified that error appears in the above-identified patent and that said Letters Patent is hereby corrected as shown below:

In column 3, line 17, delete "required The" and insert -- required. The --, therefor.

In column 3, line 37, delete "areas In" and insert -- area. In --, therefor.

In column 3, line 51, delete "data The" and insert -- data. The --, therefor.

In column 5, line 60, delete "thereof In" and insert -- thereof. In --, therefor.

In column 6, line 34, delete "location" and insert -- Location --, therefor.

In column 7, line 40, delete "29f a" and insert -- 29f, a --, therefor.

In column 9, line 29, delete "users" and insert -- user's --, therefor.

In column 9, line 58, delete "an an arrow" and insert -- an arrow --, therefor.

In column 10, line 54, delete "layout Other" and insert -- layout. Other --, therefor.

In column 11, line 23, delete "storage," and insert -- storage --, therefor.

In column 11, line 24, delete "DEE" and insert -- DELETE --, therefor.

In column 12, line 64, delete "stored To" and insert -- stored. To --, therefor.

In column 13, line 10, delete "art The" and insert -- art. The --, therefor.

In column 13, line 30, delete "PCD)" and insert -- PCD --, therefor.

In column 16, line 53, delete "inventions" and insert -- invention's --, therefor.

Signed and Sealed this
Twenty-eighth Day of December, 2010

David J. Kappos
*Director of the United States Patent and Trademark Office*

CERTIFICATE OF CORRECTION (continued)
U.S. Pat. No. 7,702,455 B2

In column 17, line 18, in claim 1, delete "storage" and insert -- storage, --, therefor.

In column 18, line 4, in claim 1, delete "uggest" and insert -- suggest --, therefor.

In column 18, line 14, in claim 5, delete "storag" and insert -- storage --, therefor.

In column 18, line 16, in claim 6, delete "memo" and insert -- memory --, therefor.